United States Patent [19]

Warner

[11] Patent Number: 4,669,530
[45] Date of Patent: Jun. 2, 1987

[54] HEAT EXCHANGER METHOD AND APPARATUS

[75] Inventor: Donald F. Warner, Latham, N.Y.

[73] Assignee: Heat Exchanger Industries, Inc., Latham, N.Y.

[21] Appl. No.: 810,557

[22] Filed: Dec. 19, 1985

Related U.S. Application Data

[60] Division of Ser. No. 671,494, Nov. 14, 1984, Pat. No. 4,577,380, which is a division of Ser. No. 406,774, Aug. 10, 1982, Pat. No. 4,487,139, which is a continuation-in-part of Ser. No. 252,297, Apr. 9, 1981, abandoned, and a continuation-in-part of Ser. No. 081,789, Oct. 4, 1979, abandoned.

[51] Int. Cl.$^4$ .......................... F28F 13/18; F28B 1/00
[52] U.S. Cl. ......................... 165/1; 165/111; 165/133; 165/145; 165/909; 165/180
[58] Field of Search ............... 165/134.1, 133, 145, 165/909, 921, 180, 111

[56] References Cited

U.S. PATENT DOCUMENTS

| 2,801,830 | 8/1957 | Frisch | 165/921 |
| 2,838,287 | 6/1958 | Kuhner | 165/921 |
| 3,050,786 | 8/1962 | St. John et al. | 165/133 |
| 3,556,207 | 1/1971 | Piaskowski et al. | 165/134.1 |
| 4,193,180 | 3/1980 | Press | 165/180 |
| 4,296,804 | 10/1981 | Press et al. | 165/180 |

FOREIGN PATENT DOCUMENTS

| 2286359 | 4/1976 | France | 165/133 |
| 2331763 | 6/1977 | France | 165/133 |
| 1042386 | 9/1966 | United Kingdom | 165/133 |
| 1042387 | 9/1966 | United Kingdom | 165/133 |

Primary Examiner—Albert W. Davis, Jr.
Attorney, Agent, or Firm—Richard G. Stephens

[57] ABSTRACT

An exhaust gas containing sulfur trioxide is passed through a first heat exchanger which cools the gas to a temperature which is above the sulfur trioxide dewpoint, so that condensation of sulfur trioxide does not occur in the first heat exchanger, but below a material limit operating temperature of a second heat exchanger, which further cools the gas below the sulfur trioxide dewpoint, whereby the first heat exchanger is protected against corrosion and the second heat exchanger is protected against thermal damage.

5 Claims, 26 Drawing Figures

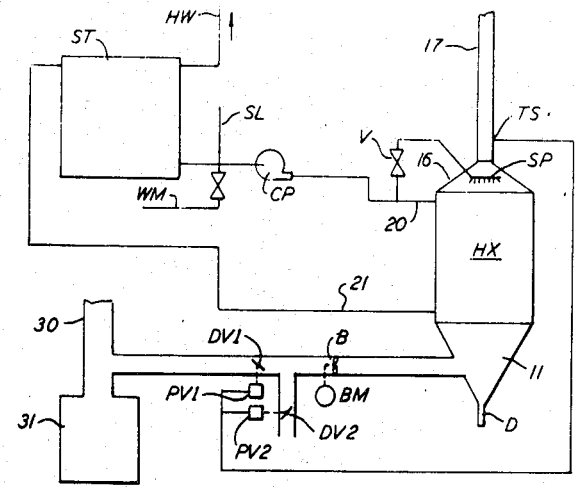
FIG. 3a
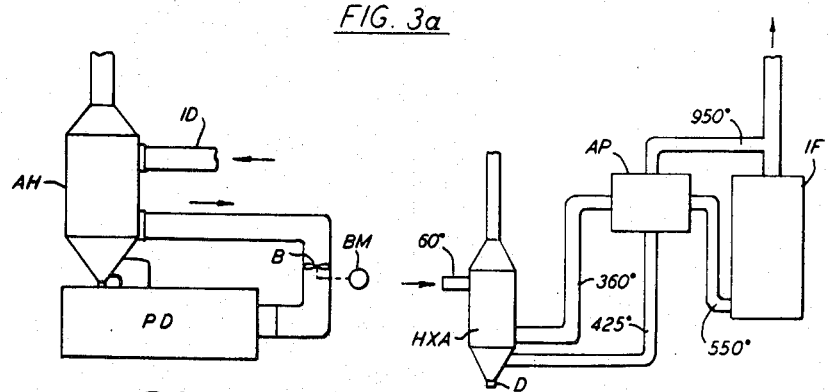
FIG. 3b
FIG. 3c
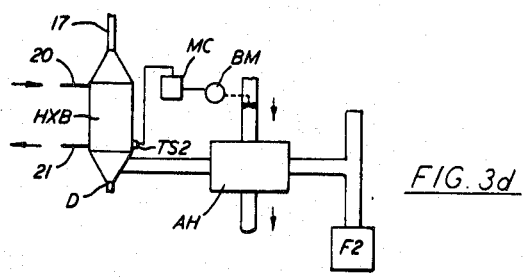
FIG. 3d

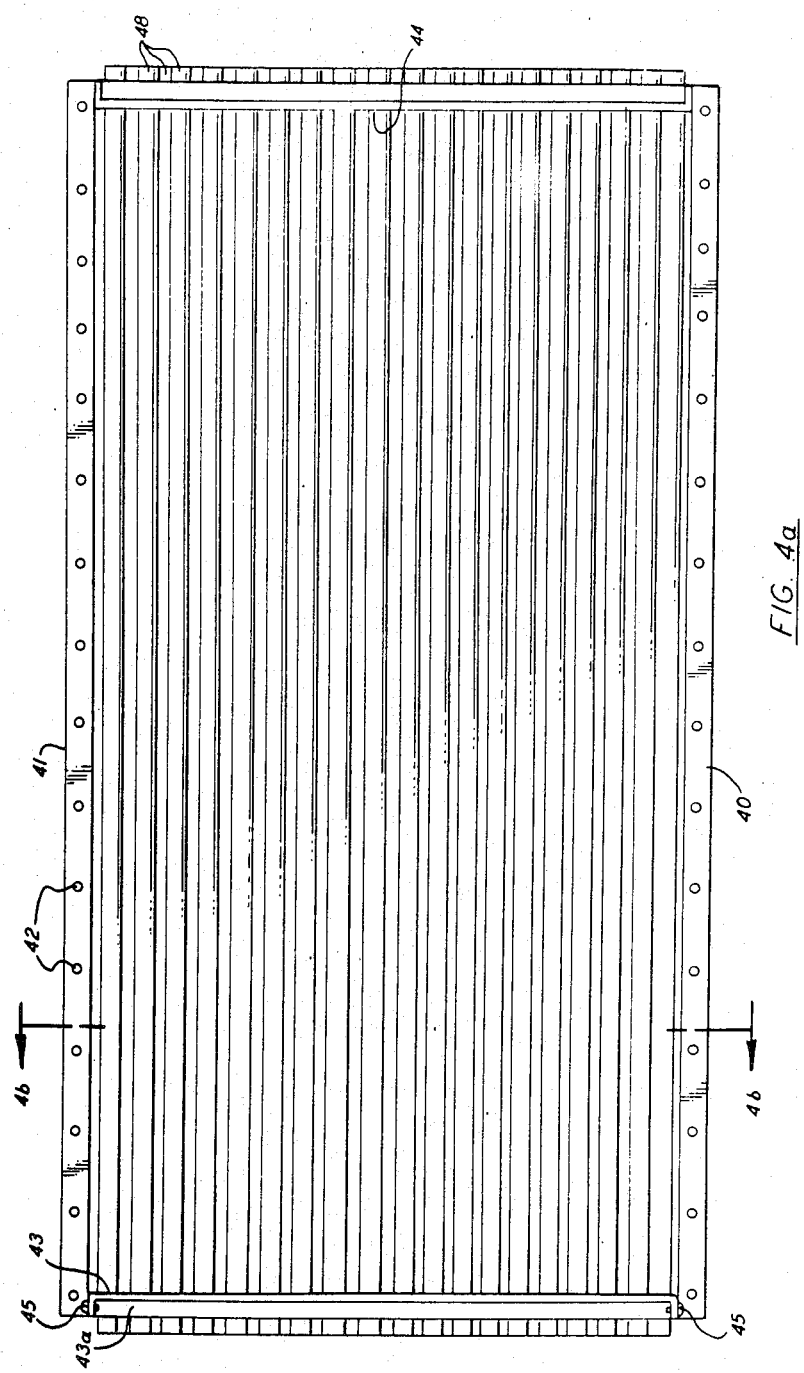

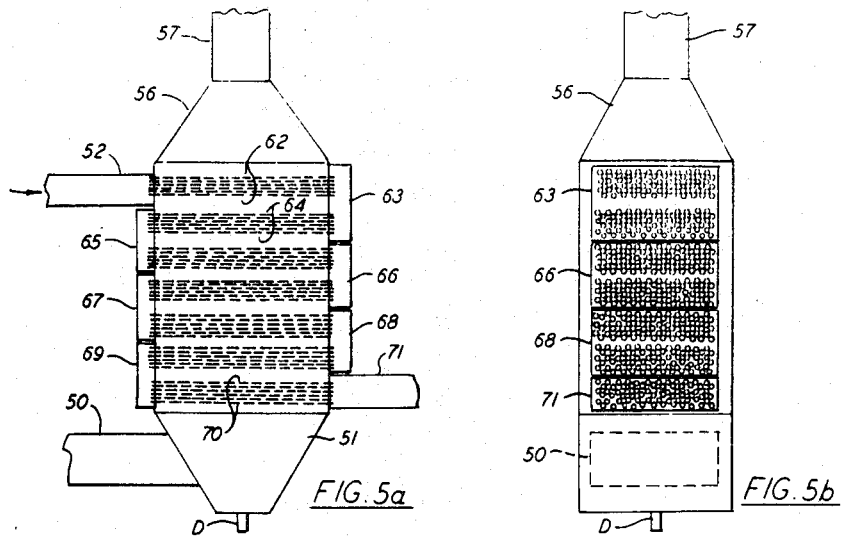
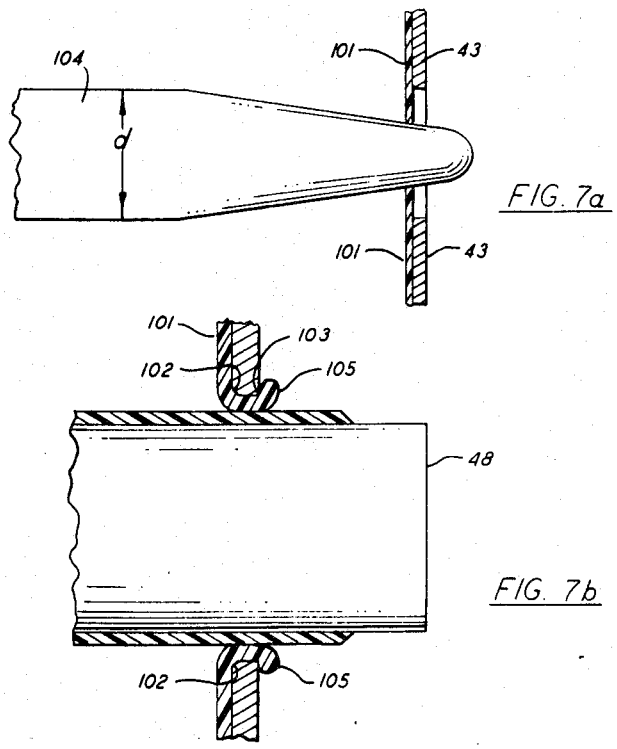

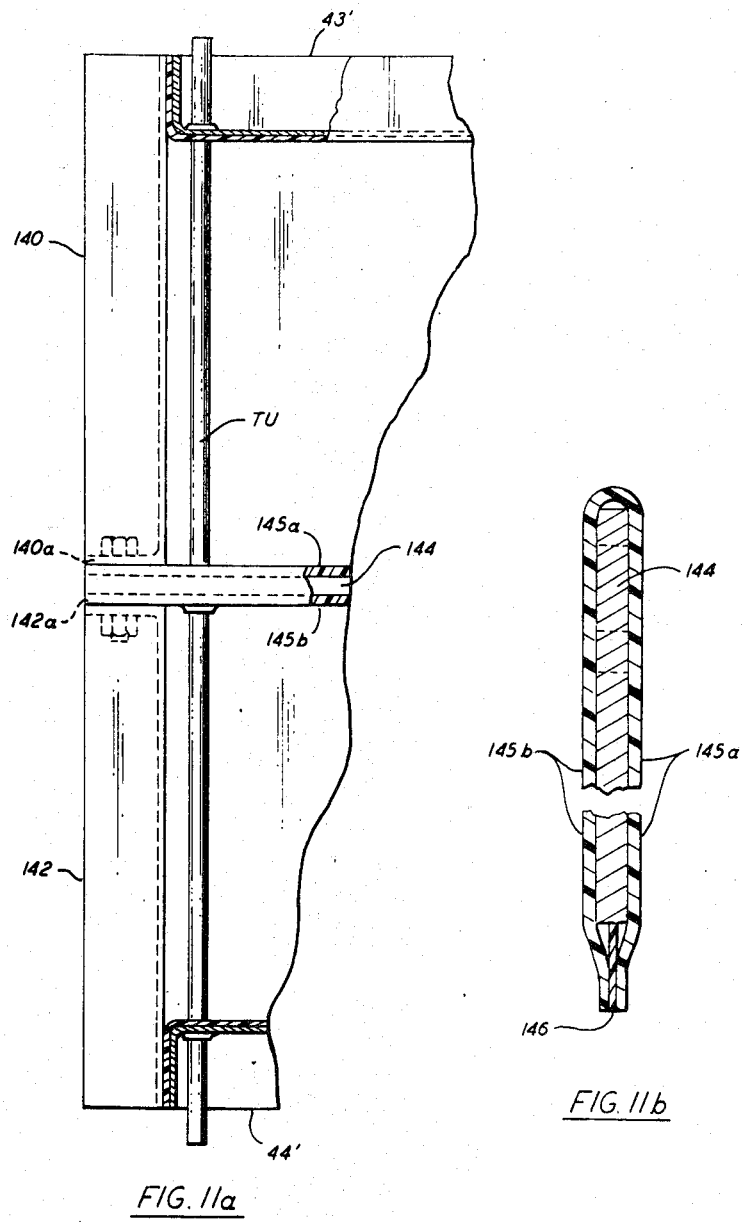

HEAT EXCHANGER METHOD AND APPARATUS

This application is a division of my copending Application Ser. No. 671,494 filed Nov. 14, 1984 now U.S. Pat. No. 4,577,380 granted Mar. 25, 1986, which was a division of Application Ser. No. 406,774 filed Aug. 10, 1982 now U.S. Pat. No. 4,487,139 granted Dec. 11, 1984, which was a continuation-in-part of Application Ser. No. 252,297 filed Apr. 9, 1981 now abandoned and a continuation-in-part of Application Ser. No. 81,789 filed Oct. 4, 1979 now abandoned.

My invention relates to exhaust gas treatment method and apparatus, and more particularly, to improved method and apparatus useful not only for recovering large amounts of heat from various industrial exhaust gases, but also for simultaneously removing substantial amounts of particulate matter and corrosive products of combustion from such exhaust gases, thereby to reduce air pollution from stack emissions. The invention is particularly directed toward such treatment of sulfur-containing exhaust gases, such as those typically produced by burning oil or coal in furnaces, though it will become apparent that the invention will be useful in a wide variety of other applications. A primary object of the invention is to provide method and apparatus which are useful for recovering a substantially larger percentage of the heat contained in an exhaust gas than that recovered in typical prior systems, which has very important economic implications, due to the high costs of fuels. Another important object of the invention is to provide method and apparatus which are useful for removing substantial amounts of particulate matter and corrosive products of combustion from exhaust gases, thereby decreasing pollution. Natural gas, #2 fuel oil, #6 fuel oil, and coal, generally ranked in that order, produce flue gases containing increasing amounts of sulfur dioxide and sulfur trioxide, and particulate matter, such as soot and silica products. One object of the invention is to provide method and apparatus which is useful in connection with flue gases produced by any of those fuels.

In many applications it is desirable that waste heat be used to pre-heat a liquid, such as boiler make-up water, or industrial process water as examples, while in many other applications it may be preferred that waste heat be used to preheat a gas, such as air, and in some applications to heat both a liquid and a gas. Another object of the invention is to provide a method which lends itself to preheating of either a liquid or a gas or both a liquid and a gas, and to provide apparatuses which preheat liquid or a gas or both a liquid and a gas.

A very important object of the present invention is to provide method and apparatus which is rugged and reliable, and useful over long periods of time with minimum attention, and minimum requirements for "downtime" for cleaning or repair.

Another more specific object of the invention is to provide a heat exchanger which functions as a self-cleaning gas scrubber as well as recovering increased amounts of heat from an exhaust gas.

It long has been known that the thermal efficiency of a plant or process can be increased by recovering some of the heat energy containin the exhaust gas from a boiler furnace or the like. Flue gas commonly is directed through boiler economizers to preheat boiler feedwater, and commonly directed through air preheaters to preheat furnace combustion air, in each case providing some increase in thermal efficiency. The amount of heat which it has been possible to recover from flue gas ordinarily has been quite limited, due to serious corrosion problems which otherwise result. Combustion of oil, coal or natural gas produces flue gas having substantial moisture, sulfur dioxide, sulfur trioxide, and particulate matter in the cases of oil and coal. If a heat exchanger intended to recover heat from flue gas condenses appreciable amounts of sulfur trioxide, sulfuric acid is formed, resulting in severe corrosion. The condensed sulfur product can readily ruin usual economizers and air preheaters, and the exhaust stacks associated with them. Thus prior art systems intended to recover heat from flue gas traditionally have been operated with flue gas temperatures scrupulously maintained high enough to avoid condensation of sulfur products.

The temperature at and below which condensation will occur for a flue gas not containing any sulfur oxides, i.e., the dew point due to water vapor only, is usually within the range of 100° F. to 130° F., depending on the partial pressure of water vapor. But the presence of sulfur trioxide even in small amounts, such as 5 to 100 parts per million, drastically increases the temperature at which condensation will occur, far above that for water vapor only. For example, 50 to 100 parts per million of $SO_3$ may raise the dew point temperature to values such as 250° F. to 280° F., respectfully. Thus it has been usual practice to make absolutely certain that flue gas is not cooled below a temperature of the order of 300° F., in order to avoid condensation and corrosion. Such operation inherently results in an undesirably small portion of the sensible heat energy being extracted from the flue gas, and in absolutely no recovery of any latent heat energy contained in the flue gas. One concept of the present invention is to provide method and apparatus for recovering heat from a potentially corrosive exhaust gas, such as flue gas, in a manner directly contrary to prior art practices, using a heat exchanger which continuously operates in a "water-condensing" mode, allowing substantial amounts of latent heat, as well as more sensible heat, to be recovered from the exhaust gas. The term "water condensing" is meant to mean that the temperature of a large percentage (and ideally all) of the exhaust gas is lowered not only below the sulfuric acid condensation or saturation temperature, but even below the saturation temperature of water at the applicable pressure, i.e. below the dew point, e.g. 120° F., for water vapor only. In a typical operation of the invention where absolute pressure of the flue gas within a heat exchanger is of the order of 0.2 to 5 inches of water, the temperature of large portions of the flue gas is lowered at least below 120° F. to a temperature of say 75° F. to 100° F., by passing the flue gas through a heat exchanger scrubber unit. The unit continuously condenses a large amount of water from the flue gas, as well as condensing sulfuric acid. Parts within the heat exchanger-scrubber unit which would otherwise be exposed to the corrosive condensate are appropriately lined or coated with corrosion-resistant materials, e.g. a fluoroplastic such as "Teflon" (trademark of E. I. duPont de Nemours & Co., Inc.) to prevent corrosion.

When prior art waste heat recovery systems have been operated with flue gas temperatures (e.g. 250° F.) too near the $SO_3$ condensation temperature, whether by accident, or during startup, or in attempts to improve system thermal efficiency, the occasional condensation of $SO_3$ tends to produce very strong or concentrated sulfuric acid. The sulfuric acid, is extremely corrosive and can rapidly destroy an ordinary heat exchanger. The volume of sulfuric acid which can be condensed is small, but sufficient to keep heat exchanger surfaces slightly moist. However, if one not only ignores prior art practice, but operates in direct contradiction thereto, and further lowers the flue gas temperature to a level markedly below the $SO_3$ condensation temperature, to operate in the water condensing mode of the invention, the production of large amounts of water tends to substantially dilute the condensed sulfuric acid, making the resultant overall condensate much less corrosive, and less likely to damage system parts. Thus operation in the water condensing mode of the invention has an important tendency to lessen corrosion of system parts, as well as allowing large amounts of latent heat energy to be recovered. Such dilution of the sulfuric acid does not wholly eliminate corrosion, however, so that it remains necessary to appropriately line or coat various surfaces within the heat exchanger-scrubber unit with protective materials.

I have discovered that if I pass flue gas through heat exchanger apparatus which is operating in the water condensing mode, not only can much more heat energy be extracted from the flue gas, and not only can the condensate be made less corrosive, but in addition, large amounts of particulate matter and $SO_3$ simultaneously can be removed from the flue gas, thereby considerably reducing air pollution. I have observed that if flue gas is cooled slightly below the sulfuric acid condensation temperature, and if the flue gas contains a substantial amount of particulate matter, a soggy mass of sulfuric acid combined with particulate matter often will rapidly build up on heat exchange surfaces, and indeed the buildup can clog the heat exchanger in a matter of a few hours. But if the system is operated in the water condensing mode in accordance with the present invention, the production of copious amounts of water continuously washes away sulfuric acid and particulate matter, preventing buildup of the soggy mass. In simple terms, the water condensing mode of operation forms a "rain" within the heat exchanger. The "rain" not only entraps particles in the flue gas as it falls, but it also washes away, down to a drain, particles which have lightly stuck to the wetted surfaces. Thus advantages akin to those of gas scrubbing are obtained without a need for the continuous supply of water required by most gas scrubbers, and with no need for moving parts.

Yet, even in addition to recovering large amounts of latent heat energy, greatly diluting and washing away sulfuric acid to minimize corrosion problems, and removing substantial amounts of particulate matter from exhaust gases such as flue gas, operation in the "water condensing" mode also enhances the heat transfer coefficient of heat exchanger units used to practice the invention. Heavy condensation made to occur near the top of the heat exchanger unit runs or rains downwardly, maintaining heat exchange surfaces wetted in lower portions of the heat exchanger, even though condensation otherwise is not occurring on those surfaces.

Heat transfer is improved for several separate but related reasons. Heat transfer from the gas occurs better if a surface is wet from drop-wise condensation. Use of a fluoroplastic such as "Teflon" promotes dropwise condensation. Further, the constant rain within the heat exchanger keeps the tube surfaces clean, preventing the buildup of deposits which would decrease heat transfer. Thus another object of the invention is to provide improved heat recovery apparatus having improved heat transfer.

While I have found various forms of fluoroplastics to provide very effective corrosion protection, and to have hydrophobic characteristics which cooperate with water vapor condensation to keep a water-condensing heat exchanger clean, currently available forms of those corrosion-protection materials have deformation, melting or destruction temperatures far below the temperatures of some flue gases from which it is desirable to extract waste heat. In accordance with another aspect of the present invention, I propose to operate a water-condensing heat-exchanger in cooperation with another heat exchanger of conventional type, which may be severely damaged if condensation takes place in it. The conventional heat exchanger can initially cool an exhaust gas such as flue gas down to a temperature which is low enough that it will not damage the corrosion-protection linings of the water-vapor condensing heat exchanger, yet high enough that sulfur trioxide cannot condense in the conventional heat exchanger so as to damage it. Thus some added objects of the invention are to provide improved heat recovery systems which are useful with exhaust gases having a wide range of temperatures.

Some added objects of the invention are to provide heat exchanger modules suitable for use in the mentioned water-condensing mode which can be readily combined as needed to suit a wide variety of different flow rate, temperature and heat transfer requirements. Another object of the invention is to provide a satisfactory method of constucting and assembling a water-condensing heat exchanger system.

An important further object of the invention is to provide improved condensing heat exchanger systems having improved heat transfer coefficients, so that increased amounts of heat can be recovered per unit area of heat transfer surface. More specifically, one object of the invention is to provide condensing heat exchangers having markedly improved heat transfer by reason of the exhaust gas being forced vertically downwardly, between and around horizontally-extending cylindrical tubes which carry the fluid (water or air) being heated, with condensation of water vapor from the exhaust gas occurring only adjacent a lowermost group of the tubes. Another object of the invention is to provide a condensing heat exchanger having such improved heat transfer in which effective removal of particulates also occurs.

Another object of the invention is to provide a condensing heat exchanger in which exhaust gas flow proceeds substantially horizontally, which enables one to provide heat exchangers having modest heights.

Another object of the invention is to provide an improved exhaust gas scrubbing system requiring less water.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIG. 3a is a schematic diagram of one form of water heating system according to the invention.

FIG. 3b is a diagram illustrating use of the invention in connection with a direct-fired paper dryer to save heat energy and remove particulate matter from the exhaust gas from the paper dryer.

FIGS. 3c and 3d each is a diagram illustrating a use of the water-condensing heat exchanger of the present invention together with a prior art air preheater.

FIG. 4a is a plan view of an exemplary heat exchange module in accordance with the invention.

Figure 4C:
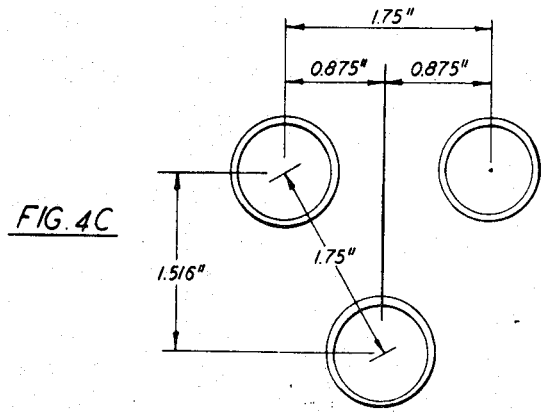
Figure 4B:
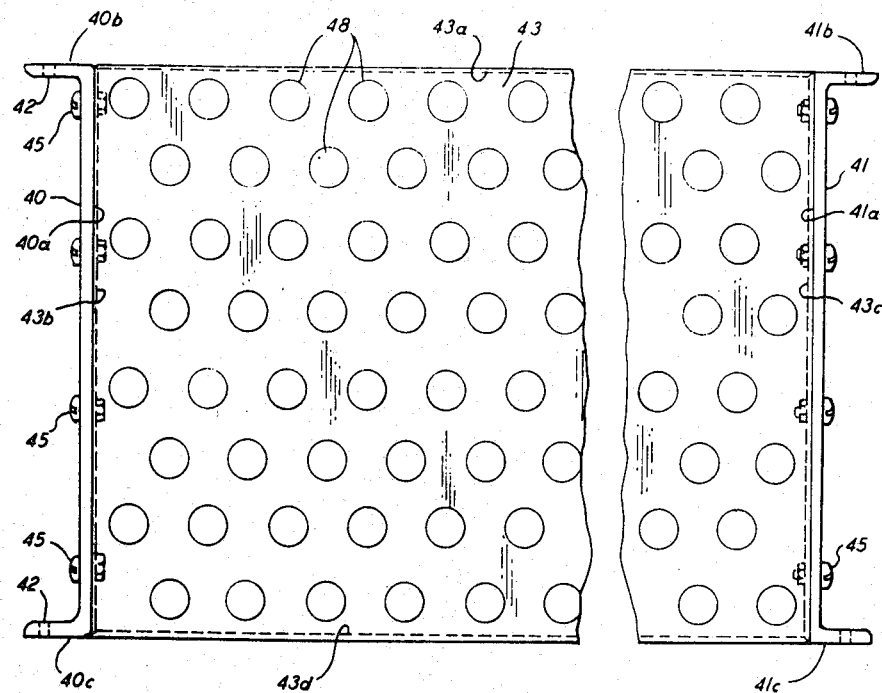

FIG. 4b is a partial cross-section elevational view taken at lines 4b—4b in FIG. 4a.

FIG. 4c is a diagram useful for understanding the heat exchange tube spacing in a preferred embodiment of the invention.

Figure 4D:
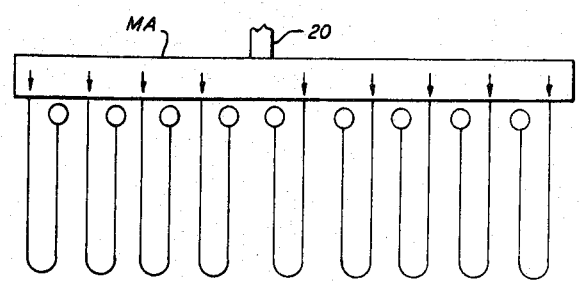

FIG. 4d is a diagram illustrating one form of water manifolding which may be used in connection with the invention.

FIGS. 5a and 5b are front elevation and side elevation views of an exemplary air heat form of water-vapor condensing heat exchanger.

Figure 6:
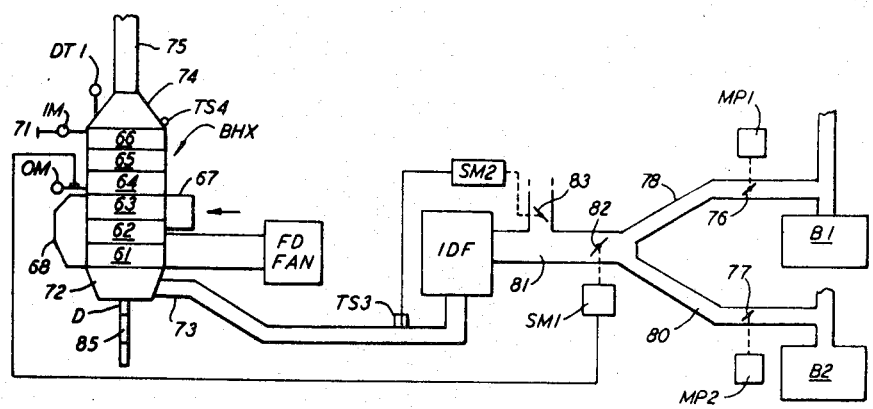

FIG. 6 illustrates an exemplary heat recovery system utilizing a heat exchanger which heats both air and water from boiler flue gas.

FIGS. 7a and 7b are partial cross-section views useful for understanding a method of assembly according to the present invention and the nature of tube-to-tube sheet seals provided by use of such a method.

Figures 8A, 8B:
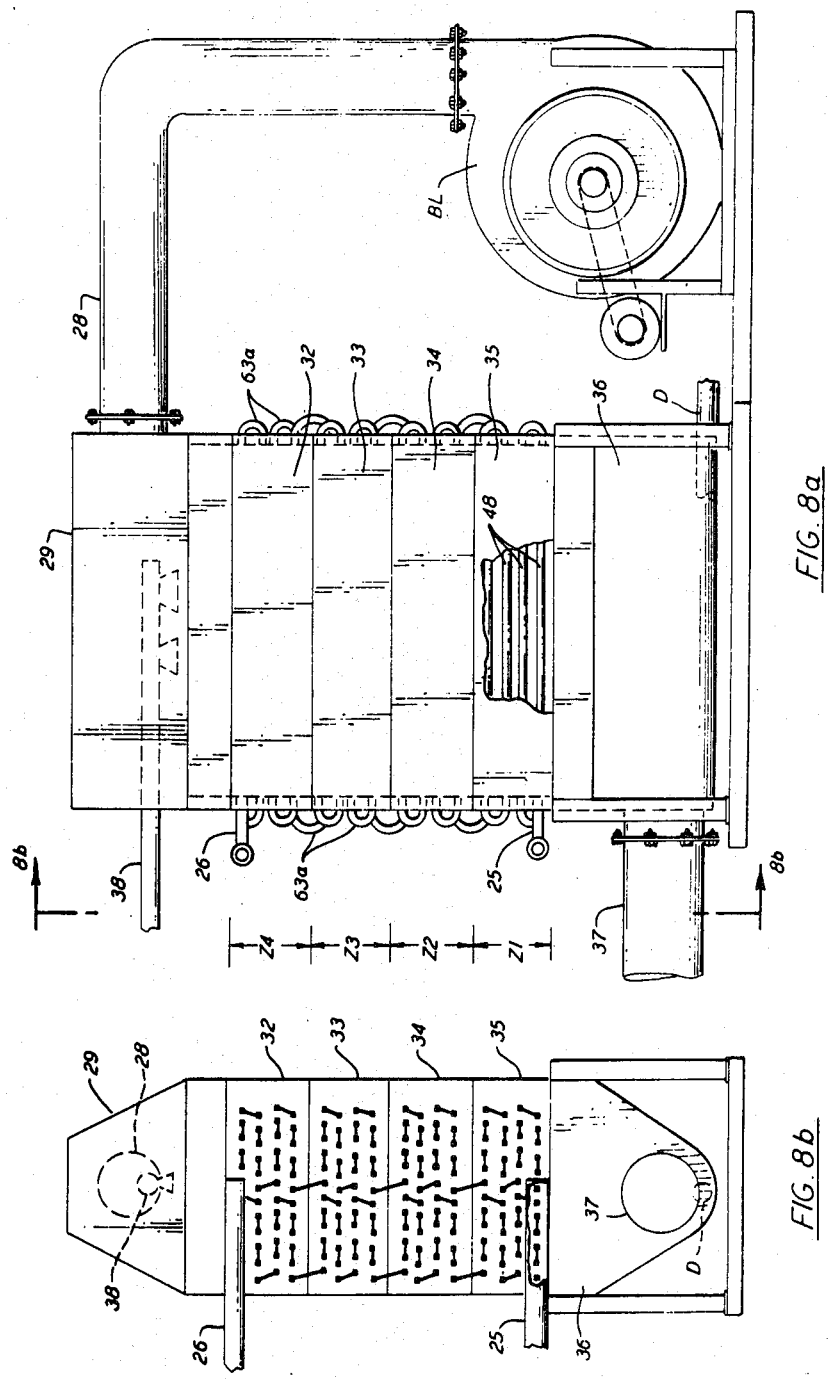
Figure 8C:
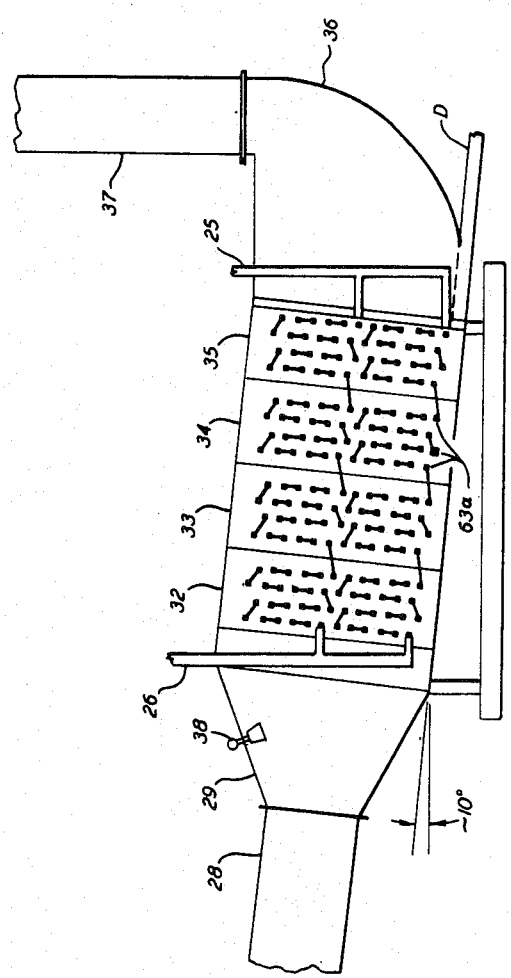

FIGS. 8a and 8b are side view and end view diagrams of a gas downflow version of the condensing heat exchanger of the invention, and FIG. 8c is a side view of a horizontal gas flow version of the invention.

Figure 9:
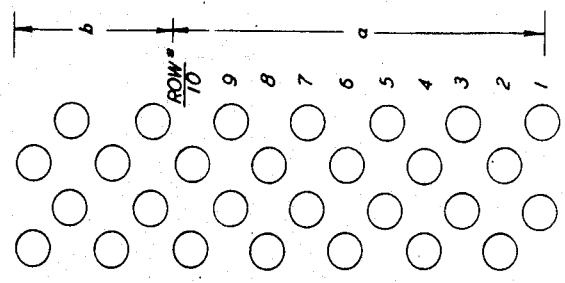

FIG. 9 is a diagram helpful in understanding the function of the improved downflow model heat exchanger of FIGS. 8a and 8b.

Figure 10:
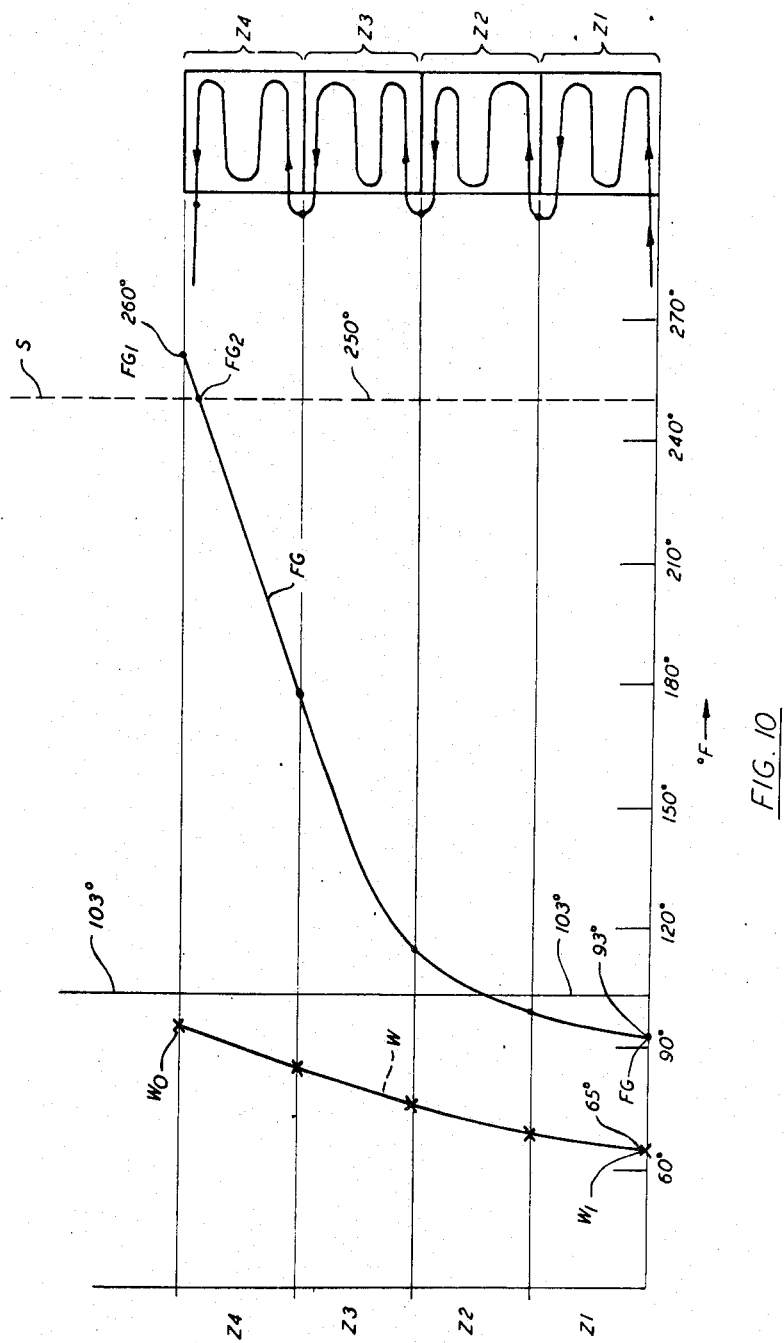

FIG. 10 is a set of graphs useful in understanding principles of the gas downflow heat exchanger of FIGS. 8a and 8b.

FIG. 11a is a partial plan view illustrating a heat exchanger module incorporating an intermediate tube support.

Figure 11D:
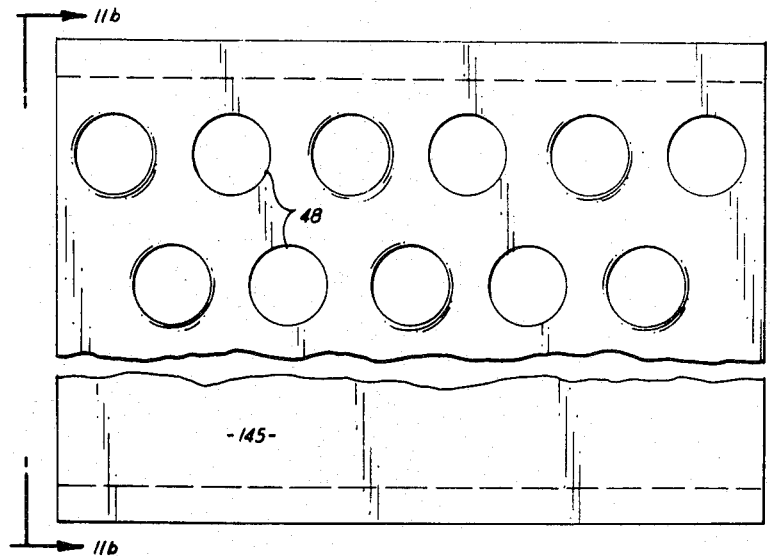

FIG. 11b is a sectional view of an intermediate tube support taken at lines 11b—11b in FIG. 11d.

Figure 11C:
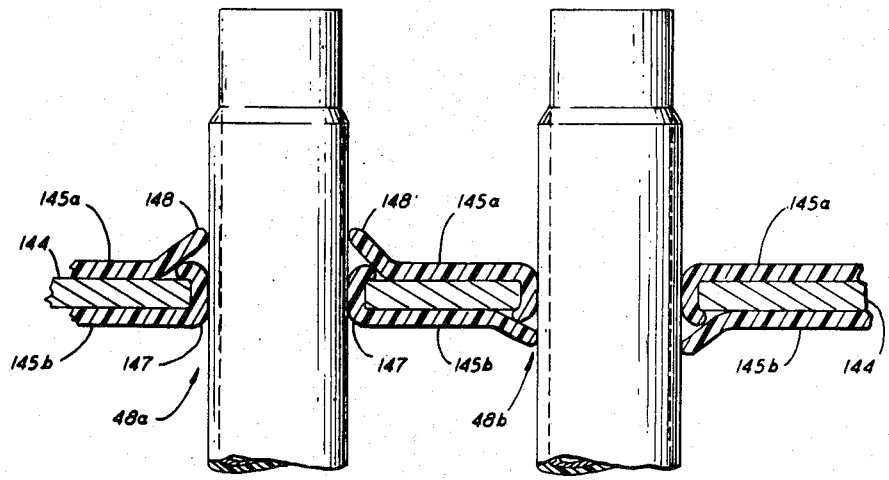

FIG. 11c is a sectional view illustrating details of the intermediate tube support.

FIG. 11d is a side view illustrating the intermediate tube support sheet.

Figure 12A:
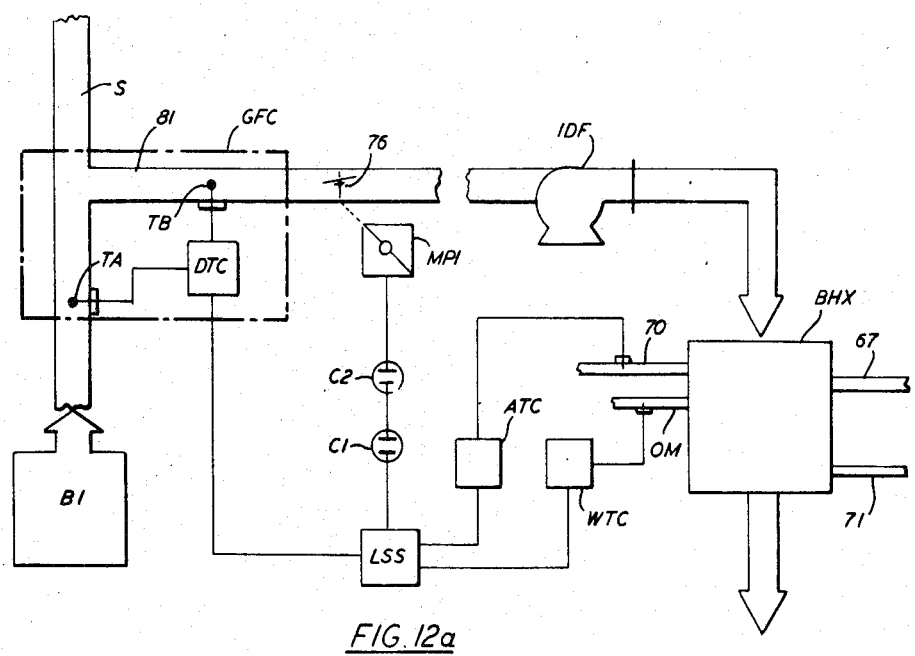

FIG. 12a is a diagram showing one alternative flue gas flow control system for use with a single boiler.

Figure 12B:
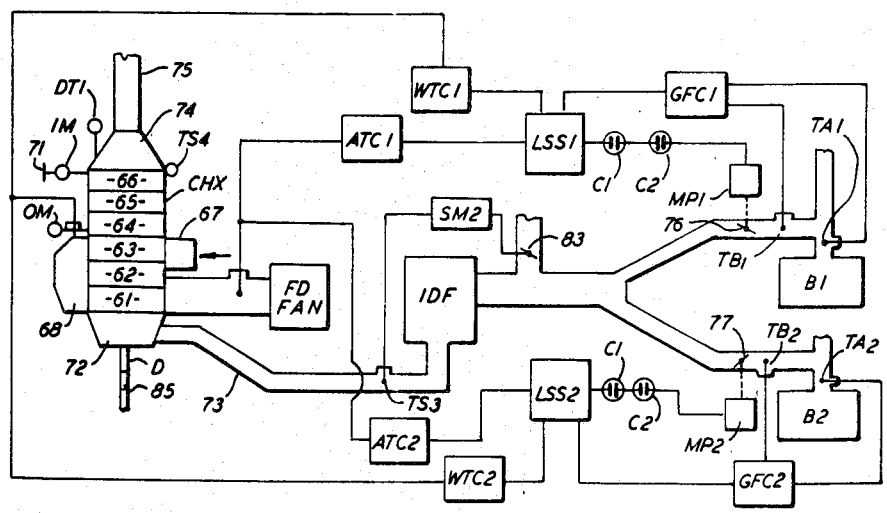

FIG. 12b is a further alternative flue gas flow control system for a multiple boiler system.

Figure 1:
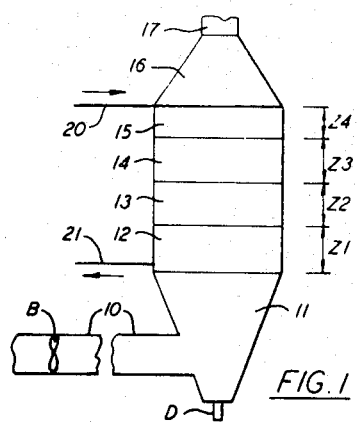
FIG. 1 is a diagram of a heat exchanger system useful in understanding some basic principles of the present invention.
Figure 2:
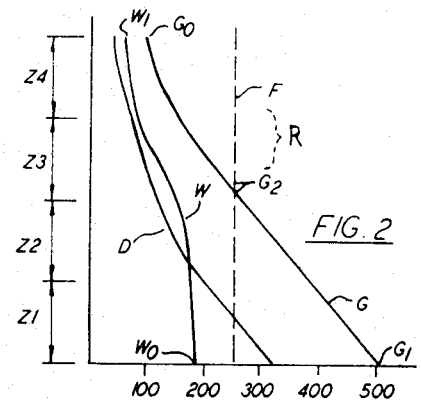
FIG. 2 is a set of graphs useful in understanding principles of one method of the present invention.

Some major principles of the present invention can be best understood by initial reference to FIGS. 1 and 2. In FIG. 1 duct 10 conducts hot exhaust gas, such as flue gas drawn from a boiler stock (not shown) by blower B, to a bottom plenum or chamber 11. The flue gas passes upwardly through one or more heat exchange units, such as the four units indicated at 12, 13, 14 and 15, thence into an upper plenum or chamber 16 and out a stack 17. In typical operations the flue gas velocity is arranged to be 10-40 feet per second within the heat exchange units, and a gas pressure drop of the order of one and a half to two inches of water is arranged to occur across the heat exchange units. A fluid to be heated, which typdically will be water or air, is shown introduced into the uppermost heat exchange unit at 20, understood to flow downwardly through successive ones of the heat exchange units, and to exit at 21. For simplicity of explanation it initially will be assumed that water is to be heated, and that the hot exhaust gas is flue gas from a boiler.

It will be apparent that the flue gas will be cooled to some extent as it travels upwardly through the unit, and that the water will be heated to some extent as it travels downwardly through the unit. To facilitate explanation, the range of elevations within which significant gas cooling and water heating occur is shown divided into four zones Z1 to Z4. The four zones are shown for simplicity of explanation as corresponding to the vertical ranges of the four heat recovery units.

FIG. 2 illustrates the variations of flue gas and water temperatures in typical practice of the invention to heat water, with the temperatures plotted against vertical elevation. Thus the temperture of flue gas falls from an assumed input temperature $G_1$ of 500° F. at the bottom of the heat exchanger system to an assumed output temperature $G_0$ of 90° F. at the top of the heat exchanger system as the flue gas travels upwardly through the heat exchanger, as indicated by curve G. The gas temperature plot in FIG. 2 should be understood to be approximate, and in general to depict for any elevation the lowest temperature to which substantial portions of the gas are lowered at that elevation. At any elevation above the lowermost row of tubes there are temperature gradients, of course, and the average temperature, if averaged over the entire cross-sectional area of the heat exchanger at a given elevation, will be above that plotted as curve G. Viewed in another way, at a given elevation, such as that bounding zones Z2 and Z3, some portions of the flue gas, such as portions near or on a tube may have the temperature $G_2$ at which sulfuric acid is forming, while other portions of the gas at the same elevation but at greater distances from any tube may be hotter and not yet experiencing condensation. Simultaneously, water assumed to have an input temperature $W_1$ of 55° F. at the top of the heat exchanger is heated to an output temperature $W_0$ of 180° F. by the time it reaches the bottom of the heat exchanger, as indicated by curve W. The ordinate scale in FIG. 1 is shown divided into the four zones Z1 to Z4. A vertical dashed line F at 250° F. indicates a typical temperature $G_2$ at which sulfuric acid forms in typical flue gas obtained from burning No. 6 fuel oil. The prior art has taught that flue gas temperature always should be maintained amply above that level in order to avoid production of any sulfuric acid.

Following the flue gas temperature curve G for upward flue gas travel, it will be seen that the flue gas temperature drops from 500° F. at $G_1$ to 250° F. at $G_2$ as the gas passes through the two lower zones, Z1 and Z2. During that portion of its upward travel very little condensation is occurring from the gas, but sensible heat from the flue gas is being transferred to heat the water. More precisely, most of the gas in zones Z1 and Z2 is still too hot for sulfuric acid to condense, but some amounts of the gas in zones Z1 and Z2 will condense while in those zones, because condensate falling through those zones from above will cool some amounts of gas in those zones to the condensation temperature. Even though little or no condensation from the gas is occurring in lower zones Z1 and Z2, the gas-side surfaces of heat exchanger tubes in those lower zones will continuously remain wet, by reason of copious condensation falling from above. The wet condition of those tubes causes particulate matter to tend to lightly and temporarily stick to them, but condensate falling from above acts to continually wash them, washing sulfuric acid and particulate matter down to the drain (D, in FIG. 1) at the bottom of the heat exchanger unit.

As the flue gas is cooled below 250° F., a typical dew point for sulfur trioxide, sulfuric acid forms in zone Z3. If zone Z3 were the uppermost zone in the system, the condensed sulfuric acid would slightly wet heat exchanger surfaces in zone Z3, and particulate matter would build upon those slightly wetted surfaces. The sulfur trioxide condenses to form sulfuric acid in the assumed example, as gas travel through zone Z3 cools the gas substantially below the acid dew point. At some level within zone Z3 most or all of the sulfuric acid which will be condensed, will have condensed. Just above that level there is believed to be a range of elevations, indicated generally by bracket R in FIG. 2, in which one might deem little or no condensation to be occurring, the gas temperature being low enough that condensation of sulfuric acid has been largely completed, but being too high for water vapor to condense in substantial quantities. However, as the gas in further cooled during further upward travel through zone Z1, condensation of water vapor occurs in an increasingly copious manner. Thus all of the tubes in the heat exchange units are continuously wet, which not only increases heat transfer, but which, at the mentioned gas flow rate, also causes particulate matter to tend to temporarily and lightly stick to the tubes, removing large amounts of particulate matter from the gas. The water caused by continuous condensation acts to continuously wash the surfaces of the heat exchange tubes, washing particulate matter and condensed sulfuric acid down to the drain at the bottom of the system. The tubes within the heat exchange units are arranged in successive rows which are horizontally staggered relative to each other, so that a drop of condensate falling from one tube tends to splash on a tube below. A double form of cleaning of the flue gas occurs, from the combined scrubbing of the gas as it passes through the falling rain of condensate, plus the tendency of the particulate matter to temporarily and lightly adhere to the wetted tubes until condensate washes it away. The thin coverings of fluoroplastic on the heat exchange tubes not only prevent corrosion of those tubes while allowing good heat transfer, but because those coverings are hydrophobic, the falling condensate is readily able to wash away particulate matter from the tubes. Tests recently conducted by Brookhaven National Laboratory indicate that approximately 70%±5% of the total suspended particulates and 20% to 25% of the $SO_3$ in flue gas from No.6 fuel oil can be removed. In a typical application of the invention, if say 9660 pounds per hour of flue gas from No. 6 oil are passed through the water condensing heat exchanger, approximately 250 pounds per hour of water mixed with sulfuric acid and particulate matter will be drained from the bottom of the unit. The particulate matter in the mixture has been about 3% by weight in tests made to date.

The amount of sulfur trioxide in typical flue gas is measured in parts per million, so that the amount of sulfuric acid which even complete condensation of sulfur trioxide could produce is much, much less than the amount of water which can readily be condensed if the flue gas is cooled sufficiently. The precise temperature at which water vapor in flue gas will condense varies to some extent in different flue gas mixtures from 100° F. to 130° F., but it is typically 120° F.(49° C.). Thus in accordance with the present invention, water (or air) at or below that temperature, and preferably well below that temperature, is maintained in a group of tubes near the top of the heat exchanger unit, insuring that large amounts of water vapor condense. In FIG. 2 the water temperature is assumed to rise from 55° F. to about 75° F. as the water passes downwardly through zone Z4. Thus substantial tube volume at the upper portion of the heat exchanger system in FIGS. 1 and 2 contains water below 120° F.

It may be noted that in the example of FIG. 2, the water temperature reaches the water vapor dew point (120° F.) at substantially the same elevational level where the flue gas temperature reaches the sulfuric acid dew point (250° F.), and further, that the level occurs substantially at the vertical mid-level of the heat exchanger. Those precise relationships are by no means necessary.

In FIG. 2 curve D is a plot of the difference between flue gas temperature and water temperature versus elevational level in the heat exchanger unit. The temperature difference at a given level has an important bearing, of course, on the amount of heat transfer which occurs at that level. It is important to note that near the bottom portions of the heat exchanger unit, in zones Z1 and Z2, there is maximum difference between gas temperature and water temperature and hence a maximum potential for effective heat transfer.

It may be noted that in most systems constructed in accordance with the invention, the flue gas exit temperature, measured in chamber 16 or stack 17 in FIG. 1, for example, will be less than the flue gas water vapor dew point temperature of say 120° F., but in some systems the exit temperature at such a location may exceed that dew point to some extent, without departing from the invention. If the heat exchanger tube and housing geometry allows some quantum of flue gas to pass through the unit with only modest cooling, that quantum will mix in chamber 16 with flue gas which has been cooled sufficiently to condense large amounts of water, and tend to raise the average or mixture temperature in chamber 16, in the same manner that by-passing some flue gas around the heat exchanger and admitting it to chamber 16 would raise the average temperature in that chamber.

From the above it will be seen that the method of the invention comprises simultaneous recovery of both sensible and latent heat from a hot exhaust gas containing water vapor, a condensable corrosive constituent (sulfur trioxide) and particulate matter, and removal of substantial amounts of the particulate matter and condensed corrosive constituent from the gas, by passing the gas through a gas passage of a heat exchanger, simultaneously passing a fluid cooler than the exhaust gas through a second passage of the heat exchanger in heat exchange relationship with the gas passage, with the flow rates of the gas and fluid arranged in relation to the heat transfer characteristics of the heat exchanger so that continuous condensation of water vapor and the corrosive constituent occurs, providing falling droplets which capture and wash away portions of the particulate matter and condensed corrosive constituent.

While prior art economizers and air preheaters require hot input water or air, the invention advantageously can use cold water or air, and indeed, efficiency increases the colder the input fluid is, with more condensation occurring and more latent heat being extracted from the exhaust gas. The cooler the water at inlet 20, the lower the exit temperature of the exhaust gas will be, the more latent heat will be recovered, the more water vapor will be condensed from the exhaust gas, and the more effective particulate and $SO_3$ removal will be, for given flow rates. Tests to date have indicated that with a gas velocity of the order of 30-40 feet per second, provision of sufficient heat exchange surface area will enable one to lower the temperature of the exiting flue gas to within about 8° F. of the input temperature of the fluid being heated, be it water or air. For example, with water being supplied to the heat exchanger at 55° F., it has been possible to obtain flue gas exit temperatures of 63° F. In most applications of the invention it will not be deemed necessary to lower the flue gas temperature to that extent, and the amount of heat exchange surface will be selected so that with the desired flow rates and fluid temperature the flue gas temperature will be lowered to within the range of 80° F.-100° F. Typical flue gases contain 5% to 12% water vapor, depending upon the type of fuel, so if a 10,000 pounds of flue gas are passed to a heat exchanger in an hour, that represents 500-1200 pounds of water per hour. By operating in the water-condensing mode, several hundreds of pounds of water will condense per hour.

The advantageous effect which very substantial water condensation has on heat transfer has been illustrated by operating one form of the invention under two sets of operating conditions. The unit was first operated with flue gas produced by burning No. 2 fuel oil, with particular inlet and outlet temperatures and flow rates of flue gas and water. The heat recovered was measured to be approximately 1,000,000 Btu per hour, and condensate flowed from the unit at approximately one-half gallon per minute. Under such circumstances the latent heat amounted to approximately 24% of the total heat being recovered. Then later, flue gas produced by burning natural gas was used. The natural gas can be and was burned with less excess air, and due to the greater hydrogen content of the natural gas, the flue gas contained a greater amount of moisture. At the same gas and water flow rates as had been used with fuel oil operation, the amount of condensate which flowed from the unit was essentially doubled, to approximately a full gallon per minute. However, the water outlet temperature increased and the gas exit temperature decreased, and the heat recovered had increased approximately 20%, to 1,200,000 Btu per hour. Under these circumstances the latent heat amounted to approximately 40% of the total heat being recovered.

In the application depicted in FIG. 3a flue gas is drawn from the conventional stack 30 of boiler 31 past one or more damper valves by an induced draft blower B driven by blower motor BM, to supply the flue gas to the bottom plenum of the heat exchange unit HX, and cooled flue gas exits via fiberglass hood 16 and fiberglass stock 17 to atmosphere. The use of fiberglass stack to resist corrosion is not per se new. Cool water from the bottom of hot water storage tank ST, from a cold water supply line SL, and/or from a water main WM, is pumped through the heat exchange unit HX by circulator pump CP, and heated water from the heat exchanger is pumped into storage tank ST near its top. Hot water is drawn from the top of the storage tank via line HW for any of a variety of uses. Make-up water for boiler 31 can be supplied from tank ST, of course, or directly from unit HX.

If insufficient hot water is drawn via line HW, the contents of storage tank ST can rise in temperature enough that insufficient flue gas cooling begins to occur in the heat exchange unit, tending to endanger the fluoroplastic corrosion-protection coverings and liners in that unit. A conventional thermal sensor TS senses outgoing flue gas temperature and operates a conventional positioner PV1, which closes damper valve DV1 to decrease or terminate passage of hot flue gas to the heat exchanger. In FIG. 3a a second positioner PV2 also responsive to thermal sensor TS is shown connected to operate damper valve DV2, which can open when stack 17 temperature climbs too high, to mix cool ambient air with the flue gas, thereby to prevent temperature within the heat exchanger from exceeding a value (e.g. 550° F.) deemed dangerous for the corrosion-protective coatings. In many applications only one or the other of the two described heat limit protecting means will be deemed sufficient. As will become clear below, preventing a temperature rise which would damage the corrosion-protection coatings can instead be done by using a conventional non-condensing heat exchanger to cool the exhaust gas to a safe operating temperature before the exhaust gas is passed through the water-condensing heat exchanger.

In FIG. 3a a spray manifold SP carrying one or a plurality of nozzles is operative to spray water down through heat exchanger HX when valve V is opened, to wash away any deposits which might have built up on heat exchanger tubes. Because operation in the water condensing mode ordinarily functions to keep the tubes clean, operation of such a spray can be quite infrequent, and in some applications of the invention provision of such a spray means may be deemed wholly unnecessary. In certain applications, such as where particulate removal is deemed particularly important, valve V can be opened to permit a continuous spray, to augment the "rain" caused by water vapor condensation.

Practice of the invention may be carried out in order to heat air rather than water, utilizing heat exchanger apparatus which is extremely similar to that previously described for water heating. While use of copper tubes is preferred for water heating, aluminum tubes are preferred for air heating. In either case corrosion-protection coatings such as a fluoroplastic, e.g. "Teflon" are used.

Practice of the invention is not restricted to treatment of boiler or furnace flue gases, but readily applicable to a variety of other hot exhaust gases. In the papermaking industry it is common to provide directfired dryers in which large amounts of ambient air are heated, ordinarily by burning No. 2 fuel oil, and applied by large blowers to dry webs of paper. The heated exhaust air which has passed through the paper web contains substantial amounts of paper particles, as well as the usual constituents of flue gas, with more than usual amounts of moisture. Only a limited amount of the heated air can be re-circulated since its humidity must be kept low enough to effect drying, so substantial amounts of makeup air are required. Heating outside or ambient air to the temperature desired for paper drying requires a large amount of fuel. Prior air heat recovery techniques have been clearly unsuitable in such an application. Ambient air is always cool enough that passing such air through a usual air preheater would result in condensation of sulfuric acid from the exhaust gas, causing corrosion, and in the presence of condensation the paper particles rapidly stick to and build up on moist surfaces within the heat exchanger, clogging it. I do not believe any technique for recovering heat from a dryer has been successful. In accordance with the present invention, as illustrated in FIG. 3b, hot (e.g. 540° F.) paper-laden exhaust air from a conventional paper dryer PD is passed through the gas passage of a water-condensing heat exchanger AH, to heat ambient air which passes into and through the tubes of the heat exchanger from an ambient air inlet duct ID, whereby the ambient air is heated, from an initial temperature of say 30° F. to 100° F., up to a temperature of say 380° F. The air leaving the heat exchanger is moved through a duct by blower B to be used as make-up air in the dryer apparatus, and having been significantly pre-heated in heat exchanger unit AH, substantially less fuel is required to conduct the drying process. As in the case of the water heating systems previously discussed, sulfuric acid condenses at one level within the heat exchanger. The condensation entraps paper particles as well as other particulate matter, with incipient tendencies of causing severe corrosion and clogging, but control of flow rates in relation to temperatures in accordance with the invention, so that large amounts of water vapor are condensed at a higher elevation within the heat exchanger causes a rain to wash away the sulfuric acid-particulate matter composition. And as in the case of water heating applications, use of the water condensing mode increases the amount of sensible heat recovered, provides recovery of significant amounts of latent heat, and maintains heat exchange surfaces wet and clean to improve heat transfer.

In various applications, the hot exhaust gas supplied by a furnace or other device may have an initial temperature substantially exceeding that (e.g. 550° F.) to which the fluoroplastic protective coatings can safely be exposed, but that by no means rules out use of the invention in such applications. In FIG. 3c exhaust gas emanating from an industrial furnace IF and assumed to have a temperature 950° F., is passed to a conventional prior art air preheater AP which need not have corrosion-protective coatings. The air preheater AP also receives air from a heat exchanger HXA operated according to the invention in the water condensing mode. Heat exchanger HXA heats ambient air up to a temperature (e.g. 360° F.) substantially above that at which sulfuric acid will condense, and hence conventional preheater AP does not experience corrosion or clogging. Preheater AP further raises the temperature of the 360° F. air up to a higher temperature, e.g. 550° F., and that air is shown supplied to the burner of furnace IF. In heating the combustion air from 360° F. to 550° F., the flue gas passing through unit AP cools from 950° F. to 425° F., the latter being a temperature which the corrosion-protective coatings in heat exchanger HXA can readily withstand. With ambient air entering unit HXA at 60° F., very substantial condensation of water vapor from the flue gas occurs in unit HXA, and the same advantages of its water condensing mode of operation as previously discussed are obtained. In FIG. 3c it is not necessary that the heated air (shown at 550° F.) be supplied to the same device (shown as furnace IF) which produces the initial hot exhaust gas (shown at 950° F.); i.e. the heated air could be used for a completely different industrial process, but the arrangement shown is believed to be an advantageous and natural use of the invention. While the description of FIG. 3c refers to sulfuric trioxide as a specific condensable corrosive constituent in the exhaust gas, it will be apparent that the principles of FIG. 3c well may find application with exhaust gases which contain other potentially corrosive constituents which condense at temperatures in between the material limit operating temperature of the corrosion-protective coatings and the water vapor condensation temperature. A conventional non-condensing heat exchanger can be used to lower an exhaust gas temperature below the material limit operating temperature of the condensing heat exchanger in numerous applications where, unlike FIG. 3c, the fluid heated by the condensing heat exchanger does not pass through the conventional heat exchanger, and that fluid heated by the condensing heat exchanger can be water, of course, rather than air. In FIG. 3d exhaust gas from the stack of furnace F2 passes through a conventional air preheater AH, and thence through a water-condensing heat exchanger HXB operated according to the invention, to heat water circulated through unit HXB via lines 20,21. A thermal sensor TS2 senses the gas temperature entering unit HXB and conrols the flow of fluid being heated by the conventional heat exchanger AH, increasing that flow to decrease the temperature of the gas entering unit HXB should it begin to rise above a desired value. The thermal sensor is depicted as conrolling the speed of a blower motor BM via a motor controller MC, but it will be apparent that the thermal load imposed on unit AH may be varied in other ways in various applications, such as by positioning of a damper valve which controls flow of the cooler fluid through unit AH. While FIGS. 3c and 3d illustrate uses of water-condensing heat exchangers with conventional or prior art non-condensing heat exchangers, it is to be understood that a water-condensing heat exchanger and a non-condensing heat exchanger can be combined in the sense of being mounted adjacent each other or on a common support so as to shorten or eliminate ducting between the two heat exchangers. The usual flue gas exit temperature from many conventional economizers and air preheaters is maintained at about 350° F. to avoid condensation of $SO_3$. It is common at many steam generating plants to route boiler furnace gas successively through an economizer, an air preheater and a bag house to a stack. In order to avoid serious corrosion in the air preheater it has been necessary to preheat ambient air before it enters the conventional air preheater. Such preheating conventionally has been done by means of steam coils in the inlet air duct. In accordance with the invention, such steam coils may be eliminated. A water-condensing heat exchanger installed to receive flue gas which has passed through the conventional air preheater may be used to heat ambient air and supply it to the conventional air preheater at a sufficiently high temperature that no condensation or corrosion will occur in the conventional air preheater. Many industrial boilers use economizers to heat boiler feed water, and in many cases such boilers require 50–75% cold makeup water. The water-condensing heat exchanger of the invention may be installed to receive the flue gas exiting from the economizer at say 350° F., which normally has been expelled through a stack, to heat the boiler makeup water before the water goes to the de-aerator associated with the boiler.

It should be understood that while temperatures of the order of 500°-550° F. have been mentioned as suitable upper limits with currently available fluoroplastic materials, that such limits may rise as the thermal properties of fluoroplastics are improved in the future, or as other materials having higher material limit operating temperatures become available.

Because the heat transfer surface area which is required varies widely between different applications, it is highly desirable that water-condensing heat exchangers be made in modular form. FIGS. 4a and 4b illustrate one examplary module. Outwardly facing channel-shaped members 40,41 of formed sheet steel form rigid side members, and carry bolt-holes 42,42 in upper and lower channel flanges, allowing as many modules as may be needed to provide a desired heat transfer surface area to be stacked vertically atop one another and bolted together. The unit includes two tube sheets or end plates 43,44 which are bolted to the side members 40,41, as by means of bolts 45,45. Each tube sheet is provided with four outwardly-extending flanges along its four respective edges, such as flanges 43a to 43d shown for tube sheet 43 in FIG. 4b. In the module depicted each tube sheet carries 8 rows of holes, with 18 holes in each row, with the holes in alternate rows staggered as shown, and 144 tubes 48,48 extend between the two tube sheets, extending about 2.81 inches outside each tube sheet. In one successful embodiment the outside diameter of each tube, with its corrosion-protection coating was 1.165 inches, the tubes in each row were spaced on 1.75 inch centers, the tubes in successive rows horizontally staggered 0.875 inch, and the vertical distance between tube centers was 1.516 inch, as shown in FIG. 4c, making the center-to-center distance between tubes in one row and tubes in an adjacent row also 1.75 inch. In FIG.4c the centers of the three tubes shown, two of which are in one row and the other of which is in an adjacent lower row, lie on the vertices of an equilateral triangle. With that tube size and horizontal spacing, it will be seen that a view vertically through the module is fully occluded by the tubes, except for narrow (e.g. 7/16 in.) strip spaces adjacent the channel side members 40,41. Except in those narrow strip spaces upward passage of gas necessarily requires the gas to be deflected horizontally, promoting turbulence, and condensate which drips from a tube in any upper row tends to drip onto the center of a tube which is two rows lower. With the length of each tube inside the module equal to 54 inches, and the outside diameter of each tube equal to 1.125 inch, each tube has a surface area inside the module of 1.33 sq.ft., providing a heat transfer surface for all 144 tubes of 190.8 sq.ft. within a volume of approximately 13.5 cu.ft. Each tube comprised a Type L (0.050 in. wall thickness) copper water tube of normal 1 inch inside diameter having an actual inside diameter of 1.025 inch and an outside (uncoated) diameter of 1.125 inch. Each tube was covered with a 0.020 inch (20 mil.) thick layer of fluoroplastic, namely FEP "Teflon" (fluorinated ethylene propylene). The inside wall of each channel member and the inside walls of the two tube sheets were lined with 0.060 inch (60 mil.) thick fluoroplastic, namely tetrafluorethylene (TFE) "Teflon", and hence all surface area within the module is protected by a thin fluoroplastic covering. Tube sheet 43 carries a 60 mil layer of tetrafluorethylene fluoroplastic not only on its inside surface visible in FIG. 4b, but also on the upper surface of its upper flange 42a, the lower surface of its lower flange 42d, and the leftside and rightside (in FIG. 4b) surfaces of flanges 42b and 42c, and tube sheet 44 is covered with Teflon in the same manner. Channel shaped side members 40,41 carry a 60 mil layer of tetrafluorethylene fluoroplastic not only on their vertical (in FIG. 4b) inside surfaces 40a,41a, but also on the top surfaces 40b,41b of their upper flanges and the lower surfaces 40c,41c of their lower flanges. Thus fluoroplastic-to-fluoroplastic joints exist between the channel-shaped side members 40,41 and the side flanges of the tube sheet where they are bolted together. The fluoroplastic coverings for the tube sheets and side members are formed by cutting fluoroplastic sheet material to size, and then heating it sufficiently to make the 90-degree bends necessary to cover the flanges. Three modules of the type described were vertically stacked, to provide 572 sq.ft. of heat transfer surface area, in a system intended to handle a flue gas flow of 9660 lbs.per hour, with a gas mass flow of 0.762 lbs.per second per sq.ft. of open gas passage area. The velocity of the flue gas within the heat exchanger should be high enough to provide turbulent flow to insure good heat transfer, but not so high as to cause abrasion of the fluoroplastic coatings or to blow large amounts of condensate up the stack. Velocities within the range of 10-40 feet per second have proven suitable in the unit described. It should be recognized that smaller or larger velocities may be quite suitable in many applications of the invention.

The corrosion-prevention covering has been applied to the heat exchanger tubes by heat-shrinking, or extruding techniques generally well known. After buffing a straight section of copper (or aluminum) tube to clean it and to remove any burrs, tetrafluorethylene fluoroplatic tubing approximating the length of the metal is slid over the metal tube. Next, a short end length portion of several inches of the metal tube, covered with the fluoroplastic tubing extending slightly beyond the end of the metal tube, is immersed in a tank of propylene glycol heated to 330° F. Only the short length is immersed and heated for several seconds, causing the fluoroplastic tubing to shrink tightly about the short length of immersed metal tube. Only after the short end length of fluoroplastic has shrunk, is it safe to further immerse the assembly; otherwise heated propylene glycol might enter between the fluoroplastic tubing and the exterior surface of the metal tube. Once the short end length of tubing has shrunk, the metal tube-fluoroplastic tubing assembly may be lowered further into the propylene glycol bath to its full length, typically at a rate of about 1 foot per second. Because the heated propylene glycol flows inside the metal tube as well as surrounding the outside of the fluoroplastic tubing, uniform heating and shrinking occurs. After the full length has been immersed for 2-4 seconds the assembly may be removed from the tank. The fluoroplastic tubing increases in length as it shrinks in diameter, so that after heat shrinking it extends beyond the ends of the metal tubing, and may be cut off. The corrosion-prevention coverings alternatively can be applied to heat exchanger tubes by using hot air to heat shrink the coverings, or, the coverings may be extruded directly onto the tubes.

After a sheet of fluoroplastic has been bent to surround the flanges of a tube sheet, holes are punched through the fluoroplastic sheet concentric with the holes in the tube sheet, but with a smaller diameter. The holes in each steel tube sheet each have a diameter (e.g. 1.28 inch) which exceeds the outside diameter of the covered tubes by 0.060 in. (60 mils) the thickness of the fluoroplastic covering on the tubes, but the holes punched in the fluoroplastic tube sheet are each substantially smaller, e.g. 0.625 inch in diameter, as is shown in FIG. 7a, where portions of the tetrafluorethylene fluoroplastic sheet 101 initially cover portions of a hole in tube sheet 43. The edge of the hole in the tube sheet is preferably made slightly beveled on the inside of the tube sheet, as best seen at 102 in FIG. 7b, but flat or perpendicular on the outside of the tube sheet, as shown at 103. Next, a tapered electrically heated tool 104 is used to extrude portions of the fluoroplastic sheet through the holes in the steel tube sheet. The metal tool 104 has a rounded nose small enough (e.g. 0.375 inch) to enter a 0.627 inch hole in the fluoroplastic sheet 101, and rearwardly from the nose the tool tapers gradually upwardly to a constant diameter d equalling the outside diameter of the fluoroplastic-covered tubes to be used. The tool is heated to 780° F. With the tool nose inserted into a hole in the fluoroplastic sheet, as shown in FIG. 7a, tool 104 is urged lightly against the fluoroplastic sheet by an air cylinder (not shown). As the tool heats the edges of the hole in the fluoroplastic, the tool is gradually advanced by the constant force from the air cylinder. As the constant diameter portion of the tool nears the fluoroplastic sheet, tool advancement tends to slow or stop until the fluoroplastic is further heated, and then the tool suddenly pushes through, after which further tool advancement is prevented by a stop (not shown). The fluoroplastic then lines the hole in the metal tube sheet with a 30 mil thick lining, with some fluoroplastic extending on the outside of the tube sheet. The tool is held extending through the tube sheet for about 15 seconds while fluoroplastic on the outside of the tube sheet further heats, and then the tool is rapidly retracted out of the tube sheet. Retraction causes a collar or bead having a diameter exceeding that of the hole in the tube sheet to be formed around the hole on the outside of the tube sheet, as indicated at 105 in FIG. 7b. The rounding or beveling of the tube sheet hole on its inside edge helps prevent the fluoroplastic sheet from cracking as the tool is forced into the hole. The perpendicular edge of the hole on the outside of the sheet tends to impede inward flow of soft fluoroplastic as the tool is retracted, and consequent forming of the collar or bead 105.

Immediately (e.g. within 6 seconds) after the heated tool 104 is retracted, a plug having the same outside diameter as the fluoroplastic-covered tube to be used is inserted into the tube sheet hole through which fluoroplastic has been extruded, to prevent any decrease in diameter. Cylindrical plugs formed of many different materials can be used, but short lengths of fluoroplastic-covered copper or aluminum tubing cut from a tube covered as previously described are preferred. Thus FIG. 7b can be deemed to illustrate a tube sheet hole carrying such a plug, if item 48 is deemed to be a short length of fluoroplastic-covered tube.

When all of the holes in two tube sheets have been processed in such a manner, a pair of side members 40,41 and a pair of tube sheets are bolted together into their final configuration. Then the fluoroplastic-covered tubes are slid through mating pairs of holes in the two tube sheets in the following manner. The plug is removed from a hole in tube sheet 43, one end of a tube 48 is promptly inserted into the hole from the outside of the tube sheet 43, and the tube promptly urged inwardly until its entry end nears tube sheet 44 at the other end of the module. The tube can be manually urged through the hole in tube sheet 43 if that is done within 2 or 3 minutes after the plug has been removed. As the entry end of the tube nears tube sheet 44, the plug in the proper hole in tube sheet 44 is removed by another person at the tube sheet 44 end of the module, and the entry end of the tube can be pushed through the hole in tube sheet 44 to its final position, with two persons at opposite ends of the module pushing and pulling on the tube. That it generally requires two strong persons to slide the tube when it is installed in both tube sheets indicates the tightness of the fit which occurs. Hydraulic rams or the like can be used, of course, to facilitate insertion of the tubes. While insertion of a tube can take place over a time period of several (e.g. 3) minutes, use of less time tends to be advantageous. But in any event, insertion of the plugs into the fluoroplastic-lined holes in the tube sheets to prevent diametrical reduction until no more than a few minutes before a tube is installed, is deemed very important. With a plug maintained in each fluoroplastic-lined tube sheet hole from the time when the fluoroplastic is extruded through the hole until just before a tube is inserted in the hole, no diametrical reduction of the fluoroplastic-lined hole begins until the plug is removed. Diametrical reduction occurs slowly enough after a plug has been removed that there is time to urge a tube into place if it is done promptly enough, and then, importantly, after a tube is in place further diametrical reduction occurs, so that the TFE (tetrafluoroethylene) collar and hole lining in a given tube sheet hole tightly grips the FEP (fluorinated ethylene propylene) layer on the tube, clamping the tube very tightly in place, so that it cannot be removed except with extreme force. No other mechanism or clamping devices are used to hold the tubes in place, so that the tubes can be deemed to mechanically float relative to the tube sheets, being clamped only by the fluoroplastic collars. Such an arrangement has proven to accommodate the expansions and contractions which heating and cooling cause to occur, with no loss of integrity in the fluoroplastic-to-fluoroplastic seals.

In order to provide one water inlet and one water outlet for a heat exchanger constructed of modules of the nature shown in FIGS. 4a–4c, it is necessary, of course, to provide return bend connections on the ends of some of the tube ends extending out of the tube sheets. Conventional U-shaped copper return bends are sweated on the ends of the tubes to make such connections. The equilateral triangle spacing of the tubes advantageously allows a single type of return bend connection to be used either to connect tubes in the same row or to connect tubes in adjacent rows. While it might be possible in some applications to provide water flow serially in one path through all of the water tubes, most applications will utilize manifolding into plural water paths, to provide better and more uniform heat transfer, and to avoid tube erosion from high water velocities. For example, in a system using three modules of the 18 by 8 tube matrix shown in FIGS. 4a–4c, water was introduced into nine of the 18 tubes in the uppermost row and directed through the remaining nine tubes in that row through a series of return bends, providing flow paths as diagrammatically indicated in FIG. 4e, where arrows indicate inlet flow from a simple manifold MA (e.g. a 3-inch pipe), and circles represent connections to tubes of the adjacent lower row. Nine separate flow paths through the heat exchanger were provided in such a manner to accommodate water flow of 70 gallons per minute at a water velocity kept under 4 feet per second to avoid erosion. The overall water flow rate which is desired may vary widely in different applications. Because the tubes are straight inside the module, with all return bends connected outside the tube sheets, modules fabricated to be identical ultimately may be used to accommodate flow rates within a large range, which advantageously leads to economies in fabrication and stocking.

When most heat exchangers utilize return bends inside a heat exchanger chamber or housing, the use inside the module of FIGS. 4a–4c of only straight cylindrical sections of tubes has further significant advantages. Cleaning of the tubes by the falling condensate is more thorough and uniform because no return bends or extended surfaces are used. The use of solely straight sections also makes heat-shrinking or extrusion of fluoroplastic on the tubes practical.

In FIGS. 5a and 5b exhaust gas is conducted via inlet duct 50 into the lower plenum 51 of a water-condensing heat exchanger for upward passage between nests of fluorinated ethylene propylene fluoroplastic-covered aluminum tubes into fiberglass upper plenum 56 and out fiberglass stack 57. Each tube extends through the two tube sheets supporting its ends. An inlet air duct 52 covers one end of an uppermost group of tubes 62. The other ends of tube group 62 and the ends of a next lower group of tubes 63 are shown covered by hood or cover 63, so that air exiting from tube group 62, rightwardly in FIG. 5a, is returned through tube group 64, leftwardly in FIG. 5a. Similar hood means 65–69 similarly reverse the direction of air flow at opposite sides of the assembly. Air from the lowermost group of tubes 70 passes into outlet duct 71. FIGS. 5a and 5b illustrate a system in which air passes through the heat exchanger seven times, for sake of illustration. In actual practice one to five passes ordinarily has been deemed adequate. The insides of the tube sheets, slide members, and the covers, and the inside of plenum 51, are lined with corrosion-protection lining, as in the case of water-heating exchangers. Though not shown in FIG. 5a and 5b, it will be apparent at this point, that if desired, spray nozzles can be provided inside the air-heating heat exchanger of FIGS. 5a and 5b for the same purposes as were mentioned in connection with the water-heater heat exchanger of FIG. 3a.

In the system shown in FIG. 6 a water condensing heat exchanger BHX arranged to heat both combustion air and boiler makeup water comprises six vertically-stacked modules 61–66. Ambient or room air enters module 63 and the upper half of module 62 through an inlet duct 67, makes one pass across the heat exchanger, and is directed by return plenum or hood 68 back through the tubes in module 61 and the top half of module 62, into ducting 70 which connects to the inlet of a forced draft fan FDF.

The upper three modules 64–66 of heat exchanger BHX preheat boiler makeup water. The water flows from a cold water main source 71 to an inlet manifold IM which distributes the water laterally across the top row of tubes in module 66 in seven water flow paths which progress horizontally and vertically through modules 64–66 to outlet manifold OM. Flue gas enters lower plenum 72 of heat exchanger BHX through duct 73, and passes upwardly through modules 61 and 66 in succession, into fiberglass upper plenum 74 and thence out fiberglass stack 75. The heat recovery system of FIG. 6 is intended to accommodate flue gas, combustion air and makeup water flow rates prevailing in a boiler system having two boilers B1,B2, which system produces a maximum of 50,000 pounds per hour of steam firing No. 6 fuel oil at 15% excess air and with 67% makeup water, and an average of 30,000 pounds per hour. Flue gas is pulled from the stacks of the two boilers by a single induced-draft fan IDF, with the amount of flue gas being drawn from each boiler being controlled by a respective damper, 76 or 77, which is controlled by a respective modulating positioner, MP1 or MP2, and the modulating positioners are controlled by the load on a respective boiler using conventional pneumatic control signals from a conventional boiler control system. The modulating positioners are set so that under full load conditions dampers 76 and 77 are fully open and all of the flue gas produced by each boiler is directed to heat exchanger BHX. If fan IDF were to pull more flue gas than both boilers are producing, either the boiler excess air would increase or outside air would be drawn down the boiler stacks, in either case decreasing efficiency. To avoid those problems, dampers 76 and 77 decrease the amount of flue gas drawn from each boiler when its load is decreased. The modulating positioners MP1 and MP2 close their respective dampers when their associated boilers are shut down, and they are interlocked with induced-draft fan IDF to close their dampers if fan IDF is not running, and then all flue gas will exit through the boiler stacks.

The ducts 78,80 containing dampers 76,77 merge to a common duct 81. Damper 82 in duct 81 regulates the total amount of flue gas going to heat exchanger BHX depending upon the combustion air and makeup water demand rates. Damper 82 is modulated to control the temperature of the pre-heated makeup water exiting from exchanger BHX at a desired set point (180° F.), by sensing the water temperature at its exit from unit BHX to operate a proportional servomotor SM1. Damper 82 is normally fully open, allowing all of the flue gas being produced by the boilers to pass through heat exchanger BHX, but during rapid transient conditions, or during periods of reduced makeup water requirements, more heat may be available from the flue gas than can be utilized to preheat the combustion air and makeup water, in which case the temperature of the water exiting from heat exchanger BHX will start to rise, but servomotor SM1 then will begin to close damper 82 to maintain the exit temperature of the water from heat exchanger BHX at the desired setpoint. Since the flue gas passes first through the lower air-heating section and then through the water-heating section, where the input water temperature (e.g. 46° F.) is lower than the input air temperature (e.g. 85° F.), maximum heat recovery is obtained. A further modulating damper 83 ahead of the induced draft fan operates to limit the temperature of flue gas by admitting sufficient room air to mix with the flue gas that the inlet temperature of the flue gas to heat exchanger BHX does not exceed the safe operating temperature (e.g. 500° F.) for the fluoroplastic corrosion-prevention materials which line heat exchanger BHX. Temperature sensor TS3 senses the flue gas temperature at the exit of fan IDF to control the position of damper 83 via servomotor SM2. If the temperature of the flue gas is 500° F. or less, damper 83 will be fully closed.

The flue gas passes from fan IDF through a short section of ducting 73 into bottom plenum 72, and thence upwardly through heat exchanger BHX first heating combustion air and then heating boiler makeup water, and copious condensation occurs, providing numerous advantageous effects heretofore described. Drain line D at the bottom of unit BHX includes a transparent section of tubing 85 through which the color of the condensate may be observed.

A dial thermometer DT1 located in stack 75 indicates flue gas exit temperature, which typically varies between 90° F. and 200° F., depending upon boiler load. Temperature sensor TS4 also located at stack 75 serves to shut down the heat recovery system by closing damper 82 if the flue gas exit temperature should exceed 200° F.

Simple BTU computers receive water and air temperature and flow rate signals and compute the amounts of heat recovered. At an average steam load of 30,000 pounds per hour, the combined amount of heat recovered is 3,463,000 Btu per hour. Prior to use of the condensing heat exchanger the average steam load of 30,000 pounds per hour required an average fuel consumption of 256 gallons per hour of No. 6 fuel (148,000 Btu per gallon) with a boiler efficiency of 80%. Utilizing the water-condensing heat exchanger 29.3 gallons per hour of fuel are saved, a savings of 11.5%.

The lower housing (11 in FIG. 1, for example) comprises a simple steel sheet housing completely lined with 60 mil TFE fluoroplastic, with its flanges also covered with fluoroplastic in generally the same manner as in the tube modules. The lower housing may take a variety of different shapes in various applications. An upper section (e.g. 1 foot) of drain D which connects to the bottom of the lower housing is also preferably formed of TFE fluoroplastic tubing. When No. 6 oil is used as boiler fuel, the condensate is black due to the large amount of particulate matter and $SO_3$ removed from the flue gas, while use of natural gas as boiler fuel provides a virtually clear condensate due to the very small amounts of particulate matter in the flue gas.

It is believed that flue gas flow velocities up to 60 feet per second will be quite workable, and that flue gas pressure drops across a water-condensing heat exchanger of 3 inches of water should be workable.

It may be noted that the heat exchanger units depicted in FIGS. 1-6 each have been described as employing upward flow of the exhaust gas and downward flow of the fluid (water or air) which is to be heated. I have discovered that substantially more heat can be extracted from the exhaust (flue) gas in a heat exchanger of given heat exchange surface area if both of these flows are reversed, i.e. if flue gas is arranged to pass downwardly through the chamber and the fluid to be heated passes generally upwardly through successive ones of the generally horizontal tubes.

In the heat exchanger of FIGS. 8a and 8b flue gas forced through inlet duct 28 by blower BL enters an upper housing 29 and then passes downwardly through a plurality of tube modules 32-35 into a bottom plenum 36, and then through an outlet duct 37 to a stack (not shown). Each module is shown for sake of simplicity as having only four rows of tubes, and it will be apparent that many more rows can be provided in each module. Cold water introduced into lower tubes as at 25 flows generally upwardly through successive tubes of successive modules, and hot water exits near the top of the heat exchanger, as at 26. It may be seen in terms of construction that the system of FIGS. 8a and 8b differs from that of FIG. 1 almost solely in that the directions of flows of the two fluids are reversed in a vertical, or top-bottom sense. One initially would assume that such reversals would have little or no effect on heat recovery, and that perhaps the system of FIG. 1 might provide slightly better heat transfer by reason of the condensate giving up some of its heat as it cascades down over lower tubes. But it has been found that the arrangement of FIGS. 8a and 8b provides a surprising improvement in heat recovery over that of the system of FIGS. 1 and 2. To facilitate further discussion, the system of FIGS. 1 and 2 will be characterized as a "gas upflow" system, and the systems of FIGS. 8a, 8b, 9 and 10 will be called a "gas downflow" system. In the operation of a gas downflow condensing heat exchanger according to the invention, water (or air) at or below, and preferably well below the flue gas water condensation temperature e.g. 120° F. (49° C.), is maintained in a group of tubes near the bottom of the heat exchanger unit, insuring that large amounts of water vapor condense in that lower portion of the heat exchanger.

It is believed that the gas downflow system provides an improvement in heat transfer of approximately 50% over that of the gas upflow system, so that in a given installation a gas downflow system requires only about two-thirds as much tube surface heat transfer area as a gas upflow unit requires. Such a decrease in required tube surface area drastically decreases the cost of a given installation, of course, which has important economic implications. While the principal reason for the surprising increase in heat transfer is not certain, one or more of the following theories may account for it.

In the gas upflow unit of FIG. 1 where maximum condensation occurs adjacent the top of the unit, the fall of condensate through the entire vertical length of the unit causes substantially all of the tube external surface area to continuously remain wet. It is believed to be possible that such wetting of tubes by the falling condensate in the gas upflow unit of FIG. 1 may act to undesirably shield tubes from the hot exhaust gas, thereby decreasing heat transfer in comparison to that in a gas downflow system. Conversely, in the gas downflow unit of FIGS. 8a and 8b, condensation of water occurs only adjacent a bottom group of tubes, say in 10 bottom rows of a unit having 40 rows, for example, so that any such "shielding" is much less.

In the gas upflow unit of FIG. 1 where maximum condensation of water occurs adjacent an uppermost group of tubes, drops of water fall through the entire zone within the unit where the average flue gas temperature is above water condensation temperature, and as they fall they remove some heat from the flue gas stream. As some drops of water reach very hot flue gas in the portion of the unit, they will be partially or fully vaporized, and the resulting stream then will travel upwardly with the flue gas until it reaches a level at which it will again condense. Thus some water particles likely repeatedly fall and rise within the gas upflow heat exchanger. Vaporization of a drop of water in the lower portion of the heat exchanger removes some heat from the flue gas, so that the average temperature of the flue gas as it passes upwardly through the unit is less than it would be if the drops of water were not present, and a lesser average flue gas temperature limits the amount of heat which can be extracted. In the gas downflow system of FIG. 8a wherein condensation of water occurs only adjacent a group of tubes at the lower portion of the unit, virtually all drops of water fall into the bottom plenum without passing through the zones where flue gas temperature is above water condensation temperature, so that heat is not extracted from the flue gas stream to heat or vaporize drops of water, and hence the average temperature of the flue gas during its travel through the heat exchanger is higher than in the system of FIG. 1, and more heat is extracted from the flue gas.

Assume that the tubes shown at a in FIG. 9 represent various of the tubes in a group of bottom rows of tubes of the gas downflow unit of FIG. 8a. Further assume that condensation of water occurs generally adjacent the rows of tubes at a, but that condensation of water does not occur adjacent tubes above those of group a, such as those partially shown at b. Condensation of water will not occur adjacent the tubes of group b if the flue gas temperature is roughly 120° F. or higher in that area. Condensation of sulfur trioxide to form sulfuric acid will occur adjacent some of the tubes of group b, however, since it typically occurs at temperatures of the order of 250° F. The amount of sulfuric acid which condenses is very small, of course, in comparison to the amount of water condensed in the lower portion of the heat exchanger. The tubes on which sulfuric acid forms technically might be slightly moist, but essentially dry compared to those tubes where water condensation occurs.

But returning now to the bottom group of tubes at a, note that with water traveling upwardly through the tubes, the water in the tubes in row #10 is hotter than that in the tubes of row #9, that in the tubes in row #9 is hotter than that in the tubes of row #8, etc. Thus a drop of condensate falling from a tube in one row of group a to the second lower row in group a falls to a tube having a lower temperature, and in doing will transfer some heat to that lower tube. That water-to-water heat transfer, which is potentially much more efficient than gas-to-water heat transfer, may explain the surprising improvement in heat transfer which occurs in a gas downflow unit.

While it was initially believed that maximum condensation was required near the top of a heat exchanger, to provide a substantial "rain" throughout most of the height of the heat exchanger, if effective removal of particulates from the flue gas was to be accomplished, it is believed that effective particulate removal also can be accomplished with a gas downflow system. While conclusive test data has not been gathered to evaluate particulate removal in the gas downflow system, it is believed that the gas downflow system may provide even better particulate removal than a gas upflow system, for the following reasons.

A dry solid particle will tend to be swept along in, and to remain in, the flue gas stream, no matter the direction of the flue gas stream, if the weight of the dry solid particle remains sufficiently small compared to its effective surface area. If a dry solid particle joins a droplet of moisture, the then wetted particle-droplet combination tends to have a greater weight (or mass) per unit of effective area. If that mass per unit area becomes great enough, the particle-droplet combination will tend to leave the flue gas stream, by reasons of several mechanisms. For example, if the flue gas stream were traveling horizontally in a duct of sufficient length, the particle-droplet combination would eventually reach the bottom of the duct by reason of gravitational acceleration. If the gas stream receives a substantial change in direction, say from straight down to horizontal, the momentum of the particle-droplet combination will tend to cause it to continue vertically, into the bottom plenum of a gas downflow unit. In such a case, gravitational acceleration adds to the momentum provided by gas velocity, aiding separation of the particle-droplet combination from the flue gas stream. And once a dry solid particle joins a droplet of water in the bottom section of gas downflow heat exchanger, there is no tendency for that solid particle to separate from the water droplet, because the particle-droplet combination does not thereafter pass through an area in which the droplet can be evaporated. If the gas stream instead progresses upwardly, gravitational acceleration opposes the momentum which the upward gas velocity initially provides. With less particle-droplet momentum and with no 90° bend in the gas stream direction, there is much less chance for momentum to remove a particle-droplet combination from the flue gas stream. Further, in the case of a gas upflow unit, a given particle-droplet combination formed adjacent the upper section of the heat exchanger necessarily must fall to and through the lower section of the heat exchanger to be removed from the flue gas stream. Since that lower section contains flue gas substantially above water condensation temperature, the water droplet portions of many particle-droplet combinations will re-evaporate, leaving dry small-mass solids which will be swept up the stack unless they later happen to join with other droplets of water which fall through the lower section of the heat exchanger without being re-evaporated.

As previously mentioned, in the gas downflow heat exchanger, sulfuric acid can condense on tubes above those where water condensation occurs. However, the gas velocity continuously tends to blow acid droplets downwardly, eventually onto lower tubes where copious water condensation is occurring, or into the bottom plenum 36. With the gas velocity kept reasonably low, at 50 feet per second or less in typical installations, condensed droplets of sulfuric acid tend to fall to the bottom plenum 36, until they are washed away by condensed water, rather than being swept horizontally along outlet duct 37 and up the stack. It may be noted that once a droplet of sulfuric acid condenses in the gas downflow unit of FIG. 8a, it moves only downwardly, toward a lower temperature area, and hence it cannot re-separate into $SO_3$ or $H_2O$.

In FIG. 8a the heat exchanger is shown including an optional nozzle 38 extending into duct 30 to introduce a scrubbing liquor into the flue gas stream. The liquor reacts with the sulfur dioxide in the flue gas, thereby removing sulfur dioxide from the gas which exits from outlet duct 37. With a built-in scrubber, the user can burn a much lower grade of fuel oil or coal containing substantial sulfur and still meet given restrictions on stack emissions. The liquor containing sulfur oxides falls to the bottom of the heat exchanger, and the continuous condensation of substantial amounts of water on the lower group of tubes prevents it from accumulating in the bottom of the heat exchanger. The introduction of scrubbing liquor into a flue gas stream to remove sulfur dioxide is not per se novel; however, prior systems utilizing such a technique required that very large amounts of water be supplied and injected into the flue gas stream. Use of a water-condensing heat exchanger constructed according to the present invention obviates any need for a substantial water source for such scrubbing, as well as providing the important heat recovery heretofore described herein.

The tube modules used in the gas downflow system of FIG. 8a may be identical to those described for use with gas upflow condensing heat exchangers. The lower plenum 36 and outlet duct 37 are preferably formed of fiberglass. The upper chamber 31 may be, but need not be formed of fiberglass, since no condensation occurs in that chamber. Like gas upflow units, gas downflow condensing heat exchanger units may be constructed to heat air instead of water, or both air and water, and gas downflow units may be connected in series with non-condensing heat exchangers in the same manner as has been described above for gas upflow condensing heat exchangers. The techniques heretofore described for limiting the temperature to which the fluoroplastic is exposed may be used with gas downflow condensing heat exchangers as well as gas upflow condensing heat exchangers.

FIG. 10 illustrates the variations of flue gas and water temperature in one successful embodiment of a gas downnflow heat exchanger in typical practice of the invention to heat water. Temperatures of flue gas and water are plotted against vertical elevation within a downflow unit with four heat exchanger modules. Thus the flue gas temperature falls from an input temperature $FG_1$ of 260° F. at the top of the heat exchanger to an output temperature $FG_0$ of 93° F. at the bottom of the heat exchanger as the gas travels downwardly through the heat exchanger, as indicated by curve FG. The gas temperature plot in FIG. 10 should be understood to be approximate for all points, and in general to represent for any elevation the lowest temperature to which substantial portions of the gas are lowered at that elevation. At any elevation below the topmost row of tubes there are temperature gradients, of course, and the average temperature, if averaged over the entire cross-sectional area of the heat exchanger, will be above that plotted as curve FG. Simultaneously, water having an input temperature $W_1$ of 65° F. at the bottom of the heat exchanger flows upward and is heated to an output temperature $W_0$ of 95° F. at the top of the heat exchanger as shown by curve W in FIG. 10. The vertical scale in FIG. 10 represents modules Z1 to Z4 of the heat exchanger. A vertical dashed line S at 250° F. represents a typical temperature $FG_2$ at which sulfur trioxide condenses out of the flue gas as sulfuric acid from flue gas formed by the burning of No. 6 fuel oil.

Following the flue gas temperature curve FG for downward flue gas flow, it can be seen that the flue gas cools to the sulfuric acid dewpoint $FG_2$ (250° F.) in zone 4 of the heat exchanger. As the gas exits zone 4, it has a temperature of about 180° F. Thus most if not all of the sulfuric acid will have condensed by the time the flue gas enters zone 3. As the gas passes through zone 3, the heat transfer is essentially sensible as the temperature is above the dewpoint of water. The solid vertical line at 103° F. represents the dewpoint of water at the time of the tests. As the gas enters zone 2, the heat transfer is still sensible, but as the flue gas cools to 103° F. water starts to condense and the heat transfer becomes latent. Passing from zone 2 to zone 1, the flue gas cools to a temperature $FG_0$ of 93° F. as it exits the heat exchanger unit.

The sulfuric acid condensate formed in zone 4 falls to the bottom of the heat exchanger under the influence of gravity and aided by the force of the flue gas' downward flow. As the sulfuric acid falls through zones 3–1, the temperature inside the heat exchanger is always below the dewpoint temperature for sulfuric acid. This prevents the acid from re-evaporating and escaping through the exhaust stack as a gas. Water condensing in zones 2 and 1 also falls to the bottom of the heat exchanger where it dilutes the sulfuric acid and carries it out of the unit through the condensate drain.

In various applications it becomes necessary or desirable to provide heat exchanger modules generally of the type heretofore described, but which have substantially greater length dimensions, such as 20 feet. As the lengths of modules exceed a given dimension, it becomes necessary or desirable to provide one or more supports for the tubes in between the tube sheets to prevent sagging and fatigueing of the copper tubes.

The module shown in plan view in FIG. 11a comprises first and second tube sheets 43',44' which may take the same form as tube sheets 43 and 44 of FIGS. 4a and 4b and have their insides and four respective flanges covered with a fluoroplastic as previously described. Tube sheets 43',44' are interconnected by successive pairs of side members 140,141 and 142,143. Each of the side members comprises a generally channelshaped piece of sheet metal having an integral tab portion filling its recess at one end, as shown at 140a and 142a, for example. The inner sides of the side members are covered with a fluoroplastic sheet which is formed to cover the tops of the upper flanges of the side members and the bottoms of the lower flanges of the side members. The tab portion 140a of member 140 is bolted to the tab portion of side member 142 by a plurality of bolts, such as those shown at 150,150, and side member 141 is similarly bolted to side member 143, with an intermediate support plate 144 sandwiched in between the pairs of side members.

As is shown in FIGS. 11b and 11c, support plate 144, which is preferably formed of aluminum, is sandwiched between two sides 145a,145b of folded fluoroplastic sheet 145, the edges of which extend beyond the lower edge of sheet 144, and which are heated-welded together below those edges. Such heat welding of sheet 145 prevents flue gas from reaching the upper and lower edges of support sheet 144. Sheet 145 extends laterally substantially co-extensively with sheet 144. When support plate 144 and sheet 145 are bolted between the side member pairs as shown in FIG. 11d, the vertically-extending side edges of sheet 144 are not subjected to flue gas; hence sheet 145 need not extend beyond or be formed around the side edges of sheet 144, though it may be so formed, if desired.

Support plate 144 includes a plurality of holes 48',48' through which the fluoroplastic-covered tubes of the module eventually extend. After the folds of sheet 145 have been heat-welded together to locate plate 144 therebetween, undersize holes 48 are punched through the folds of sheet 145, concentric with the holes in support plate 144. A heated die of the nature of die 104 in FIG. 7a is then forced through each of the concentric trios of holes. The die is forced in opposite directions through various of the trios of holes, preferably in opposite directions through any adjacent trios of holes. In FIG. 11c wherein the die was forced upwardly as viewed in that figure, a portion of sheet 145a is urged through the hole 48a' to form a seal at 147 generally similar to that shown in FIG. 7b, and a portion of sheet 145b is formed to extend away from the support plate 144, as at 148. In adjacent hole 48b', through which the die was forced downwardly as viewed in the figure, a portion of sheet 145b is forced through hole 48b', and a portion of sheet 145a is formed to extend away from the support plate 144. Plug means (not shown) are placed in the holes as soon as such forming has been completed, to prevent holes 48a,48b in sheets 145a,145b from shrinking in diameter, and the plugs are removed just before fluoroplastic-covered tubes TU are urged through holes 48. The tubes TU then will be tightly gripped by both sheets 145a and 145b, as well as being gripped at tube sheets 43,44 (FIG. 4b).

While the module in FIG. 11a is shown as comprising only two pairs of side members 140,142 with a single intermediate support plate 144 sandwiched between them, it will be apparent that added pairs of similar side members and added support plates of the same type may be cascaded to form heat exchanger modules of any desired length, and to allow use of tubes of very great lengths.

In FIG. 11b, the edges of sides 145a,145b of sheet 145 are heat-welded together with a 20 mil thick strip 146 of PFA fluoroplastic film sandwiched in between them. Sheet 145 comprises TFE fluoroplastic. Strip 146 is used because pieces of TFE fluoroplastic will not weld together. Support plate 144 could comprise a steel sheet, if desired.

In FIG. 8c, which illustrates a horizontal gas flow condensing heat exchanger, similar reference numerals are used for parts similar to those in FIGS. 8a and 8b. Hot flue gas introduced via duct 28 into plenum 29 by means of a blower (not shown) passes generally horizontally, rightwardly, but very slightly downwardly, successively through four modules 32-35 into outlet plenum 36 and then out through stack 37. Cold water introduced at pipe 25 passes successively through horizontally extending tubes in the modules, and hot water exits at pipe 26. The U-shaped couplings which interconnect the ends of pairs of the horizontally-extending tubes are shown at 63a,63a. The flow of flue gas will be seen to be perpendicular to the horizontal direction in which the tubes extend. The water tubes are preferably interconnected so that water flow is divided into a plurality (e.g. 4) of flow paths stacked one above another. Condensation of water from the flue gas occurs principally in the rightward or exit module 35. Condensate dripping from the upper tubes of module 35 may effect some shielding of lower tubes in that module so as to slightly decrease the heat transfer, but in an amount much less than in a gas upflow unit. An optional nozzle apparatus for introducing a scrubbing liquor is shown at 38. The modules 32-35 may be constructed identically to those described in connection with FIGS. 4a and 4b, or, they may comprise modules of substantially lesser width (lesser height in FIG. 8c). For example, while the modules shown in FIG. 8c each contain twelve rows, it will be apparent that fewer rows but more modules could be provided, resulting in a heat exchanger having less height but a greater horizontal dimension, which is often advantageous when one must fit a condensing heat exchanger into an existing boiler installation. Condensation of water from the flue gas then may be arranged to occur in the last several of the lower-height modules. With such lower height modules, falling condensate shields fewer tubes. Further, condensate falling from one tube always falls to a tube carrying water which is cooler, or about the same temperature, so that the system of FIG. 8c may operate in a manner quite similar to the apparatus of FIGS. 8a and 8b. The gas entry end of the heat exchanger is supported slightly higher than the gas exit end of the heat exchanger, giving the unit a tilt of the order of 10 degrees, so that condensate falling downwardly will run rightwardly (in FIG. 8c) to drain D. The sharp right-angle turn which the gas flow experiences at bottom plenum 36 and stack 37 tends to aid separation of particulates from the gas stream. Inasmuch as the gas, water flow and condensate falling conditions in the device of FIG. 8c should rather closely resemble those of the gas downflow heat exchanger of FIGS. 8a and 8b, it is expected that the heat transfer of the FIG. 8c device will be very nearly the same.

An improved flue gas flow control system illustrated in FIG. 12a includes a differential temperature controller DTC responsive to two temperatures $T_1$ and $T_2$ sensed by temperature probes TA and TB. Temperature probe TA is located in stack S in between the boiler and the connection of duct 81 to the stack, so that probe TA measures boiler flue gas output temperature (or that from an economizer, not shown, if one is used). Probe TB is located in duct 81, and it measures a lower temperature. The normal function of controller DTC is to control damper 76 so that all of the flue gas produced by boiler B1, plus a small amount of outside air drawn down stack S, are drawn by induced draft fan IDF and supplied to condensing heat exchanger BHX. The heat exchanger shown in FIG. 12c is assumed, for sake of explanation, to heat both water and air. At a reference steadystate operating condition, such flow of flue gas and air provides a given difference $\Delta T$ between temperatures $T_1$ and $T_2$, the latter temperature, of course, being lower.

As boiler load increases to provide more flue gas from the boiler, temperature $T_2$ tends to increase, by reason of flue gas constituting a greater percentage of the mixture being drawn into duct 81. Flue gas tends to constitute a greater percentage of the mixture because there is less restriction to flow of flue gas into duct 81 than restriction to flow of outside air down the length of stack S. As temperature $T_2$ increases, making the temperature difference $\Delta T$ smaller, a signal from controller DTC commensurate with temperature difference $\Delta T$ operates to open damper 76. When damper 76 opens sufficiently, enough cool air from the stack mixes with all of the flue gas produced by the boiler to restore the temperature difference. Conversely, as boiler load decreases to provide less flue gas, temperature $T_2$ tends to decrease by reason of flue gas constituting a lesser percentage of the mixture being drawn into duct 81, and the increased temperature difference $\Delta T$ causes controller DTC to act to close damper 76. Thus the system of FIG. 12 tends to draw all the available flue gas from the boiler, and importantly, to do so without affecting normal operation of the boiler.

In FIG. 12a the signal from differential temperature controller DTC is shown applied to control positioner MP1 through a low signal selector LSS and two pairs of contacts C1,C2. Selector LSS shown also receiving a signal from air temperature controller ATC and a signal from water temperature controller WTC. Controller ATC provides a signal commensurate with the temperature of heated air leaving heat exchanger BHX, and controller WTC provides a signal commensurate with the temperature of heated water leaving heat exchanger BHX. Selector LSS is operative to select the smallest of the three signals applied to it and to use that selected signal to control the position of damper 76. In ordinary operation, the signal from controller DTC controls the position of damper 76, but if outlet water temperature or outlet air temperature exceeds a given respective setpoint, selector LSS uses the output from controller WTC or controller ATC to partially close damper 76, thereby limiting the water or air outlet temperature. A pair of contacts C1 are opened if the boiler is shut off for any reason, and a pair of contacts C2 are opened if fan IDF is not running, and the opening of either pair of contacts causes damper positioner MP1 to fully close damper 76.

FIG. 12b illustrates a system generally similar to that of FIG. 12a except that the heat exchanger CHX of FIG. 12b is fed flue gas from two separate boilers B10 and B11. Each boiler is provided with respective gas flow control system (GFC1 or GFC2) similar to gas flow control system GFC of FIG. 12a, a respective damper and modulating positioner, and a respective low signal selector. The water temperature controller WTC in FIG. 12b applies its signal to both low signal selector circuits, and the air temperature controller ATC applies its signal to both low signal selector circuits.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. The method of recovering heat energy from an exhaust gas containing a corrosive constituent which is condensable at and below a corrosive condensation temperature by passing said gas successively through first and second heat exchangers each connected to transfer heat to a fluid, said second heat exchanger containing corrosion-protection exterior tube-coverings having a material limit operating temperature exceeding said corrosive condensation temperature, the flow rates and temperatures of said exhaust gas and the fluid being heated by each heat exchanger being arranged so that passage of said exhaust gas through said first heat exchanger cools said exhaust gas from a first temperature exceeding said material limit operating temperature to a second temperature which is below said material limit operating temperature but above said corrosive condensation temperature, and passage of said exhaust gas through said second heat exchanger cools at least a portion of said exhaust gas from a temperature above said corrosive condensation temperature to a temperature below said corrosive condensation temperature whereby said corrosive constituent does not condense in said first heat exchanger, said corrosive constituent does condense in said second heat exchanger, and the cooling of said gas in said first heat exchanger prevents thermal damage to said second heat exchanger.

2. The method of claim 1 wherein said exhaust gas comprises flue gas containing water vapor and said corrosive constituent comprises sulfur trioxide, whereby passage of said exhaust gas through said second heat exchanger produces sulfuric acid.

3. The method of claim 1 wherein the step of passing said exhaust gas through said second heat exchanger comprises passing said exhaust gas in heat exchange relationship generally perpendicularly to and between generally horizontally extending tubes of a tube nest.

4. The method of claim 1 wherein said corrosion-protection material comprises a fluoroplastic.

5. The method of claim 1 which includes the step of passing the fluid to be heated by said second heat exchanger through metal tubes in said second heat exchanger having said exterior tube coverings.

* * * * *

UNITED STATES PATENT OFFICE
CERTIFICATE OF CORRECTION

Patent No. 4,669,530            Dated June 2, 1987

Inventor(s)    Donald F. Warner

It is certified that error appears in the above-identified patent and that said Letters Patent are hereby corrected as shown below:

Col.2, line 27, change "respectfully" to --respectively--

Col.7, line 32, change "in" (second occurrence) to --is--

Col. 13, line 58, change "normal" to --nominal--

Col.20, line 44, change "ahd" to --and--

Signed and Sealed this
Tenth Day of November, 1987

*Attest:*

DONALD J. QUIGG

*Attesting Officer*      *Commissioner of Patents and Trademarks*